US012346057B1

(12) United States Patent
Gong et al.

(10) Patent No.: US 12,346,057 B1
(45) Date of Patent: Jul. 1, 2025

(54) PROCESS CARTRIDGE

(71) Applicant: JIANGXI YIBO E-TECH CO. LTD., Xinyu (CN)

(72) Inventors: Xiaomin Gong, Xinyu (CN); Shiping Ao, Xinyu (CN); Rongli Xu, Xinyu (CN); Liangliang Hu, Xinyu (CN)

(73) Assignee: JIANGXI YIBO E-TECH CO, LTD., Xinyu (CN)

( * ) Notice: Subject to any disclaimer, the term of this patent is extended or adjusted under 35 U.S.C. 154(b) by 0 days.

(21) Appl. No.: 19/084,870

(22) Filed: Mar. 20, 2025

Related U.S. Application Data

(63) Continuation-in-part of application No. PCT/CN2023/120759, filed on Sep. 22, 2023.

(30) Foreign Application Priority Data

Sep. 22, 2022 (CN) ......................... 202222514027.5
Sep. 30, 2022 (CN) ......................... 202222606339.9
Oct. 8, 2022 (CN) ......................... 202222648690.4
Nov. 5, 2022 (CN) ......................... 202222941365.7
Jun. 2, 2023 (CN) ......................... 202321394687.2
Jul. 26, 2023 (CN) ......................... 202321986045.1
May 11, 2024 (CN) ......................... 202410582510.8

(51) Int. Cl.
*G03G 21/18* (2006.01)

(52) U.S. Cl.
CPC ..... *G03G 21/1814* (2013.01); *G03G 21/1821* (2013.01); *G03G 21/1857* (2013.01); *G03G 21/1867* (2013.01)

(58) Field of Classification Search
CPC ........... G03G 21/1814; G03G 21/1821; G03G 21/1857; G03G 21/1867
See application file for complete search history.

(56) References Cited

U.S. PATENT DOCUMENTS

| | | | | |
|---|---|---|---|---|
| 11,829,100 | B2 | 11/2023 | Fukui et al. | |
| 2021/0063960 | A1* | 3/2021 | Itabashi ............ | G03G 21/1821 |
| 2022/0100146 | A1* | 3/2022 | Wan .................. | G03G 21/1814 |
| 2023/0176496 | A1 | 6/2023 | Fujino et al. | |
| 2024/0036513 | A1 | 2/2024 | Fukui et al. | |

FOREIGN PATENT DOCUMENTS

| | | | |
|---|---|---|---|
| CN | 117742116 | A | 3/2024 |
| WO | 2023176947 | A1 | 9/2023 |
| WO | 2023210511 | A1 | 11/2023 |
| WO | 2024037566 | A1 | 2/2024 |
| WO | 2024061283 | A1 | 3/2024 |

* cited by examiner

*Primary Examiner* — Sandra Brase
(74) *Attorney, Agent, or Firm* — IPro, PLLC

(57) ABSTRACT

A process cartridge having: a photosensitive drum; a drum unit comprising the photosensitive drum; a developing roller configured to deposit toner on the photosensitive drum; a developing unit comprising the developing roller; an elastic component; a retaining component. The elastic component is configured to bias the developing unit, from developing position to separation position. When the developing unit is in the separation position and a first coupling member rotates, the retaining component is configured to move in response to rotation of the first coupling member, thereby causing a protrusion to disengage from a abutment part to allow the developing unit to move from the separation position to the developing position.

19 Claims, 23 Drawing Sheets

PROCESS CARTRIDGE

TECHNICAL FIELD

The present disclosure relates to the technical field of electrophotographic imaging, and in particular to a process cartridge.

BACKGROUND

Conventionally, in the field of image forming devices using an electrophotographic forming process, it is known that an electrophotographic photosensitive member (hereinafter referred to as a photosensitive drum) and a process apparatus acting on the photosensitive drum are integrally formed into a cartridge, and this cartridge can be removed from the main assembly of the image forming device. According to the method of using the cartridge, the maintenance of the image forming devices can be performed by users themselves without relying on service personnel, so that the maintainability can be significantly improved. Therefore, this cartridge is widely used in image forming devices.

The process cartridge usually includes a developing unit and a drum unit. The developing unit includes a developing roller and a gear train that can receive external force to drive the developing roller to rotate. The drum unit includes a photosensitive drum. When the process cartridge is mounted in the image forming device and imaging is performed, the developing roller maintains contact with the photosensitive drum to allow toner on the developing roller to be transferred to the photosensitive drum. However, when the process cartridge is mounted in the image forming device and imaging is not required, the developing roller and the photosensitive drum need to maintain separated as much as possible to avoid deformation of the outer surface of the soft developing roller due to long-term contact with the photosensitive drum, thereby affecting the imaging effect of the process cartridge. Therefore, the contact or separation state switching between the developing roller and the photosensitive drum needs to be achieved by a separation and contact mechanism provided on the image forming device or the process cartridge.

SUMMARY

Disclosed herein is a process cartridge, comprising: a photosensitive drum configured to rotate about a photosensitive drum rotation axis extending in a first direction; a drum unit comprising the photosensitive drum; a developing roller configured to deposit toner on the photosensitive drum, the developing roller being rotatable about a developing roller rotation axis extending in the first direction; a developing unit comprising the developing roller and being movable relative to the drum unit between a developing position in which the toner is capable of being deposited onto the photosensitive member from the developing roller, and a separation position where at least a part of the developing roller is separated from the photosensitive drum; a chip having an electrical contact surface; an elastic component; and a retaining component; wherein the elastic component is configured to bias the developing unit, from the developing position to the separation position; wherein the retaining component has a protrusion movable relative to the developing unit; wherein the developing unit or the drum unit has an abutment part, and the protrusion is configured to engage the abutment part, and to maintain the developing unit in the separation position; wherein the developing unit further comprises a first coupling member configured to drive the developing roller to rotate; and wherein when the developing unit is in the separation position and the first coupling member rotates, the retaining component is configured to move in response to rotation of the first coupling member, thereby causing the protrusion to disengage from the abutment part to allow the developing unit to move from the separation position to the developing position.

In an aspect, the developing unit is configured to move from the separation position to the developing position by receiving a torque generated by the rotation of the first coupling member.

In an aspect, the retaining component is a gear.

In an aspect, the retaining component comprises a restricting part, and the restricting part is configured to abut at least one component in the process cartridge, thereby restricting a movement range of the retaining component.

In an aspect, the process cartridge has a first end and a second end separated from each other in the first direction; wherein the first coupling member and the retaining component are located at the first end of the process cartridge, and the electrical contact surface is located at the second end of the process cartridge.

In an aspect, when the process cartridge is oriented such that the photosensitive drum and the developing roller are located at a lower end of the process cartridge and the photosensitive drum rotation axis is below the developing roller rotation axis, the electrical contact surface is located on the drum unit and is above the retaining component.

In an aspect, the process cartridge has a first end and a second end separated from each other in the first direction, and wherein the retaining component is only at the first end or the second end.

In an aspect, the process cartridge further comprises: a protective cover at one end of the process cartridge in the first direction, the protective cover having a hole and a recess; a second coupling member configured to receive an external force and to transmit a driving force to the photosensitive drum; wherein a part of the second coupling member extends through the hole and is exposed to an outside of the process cartridge, and a part of the first coupling member extends through the recess and is exposed to the outside of the process cartridge; and wherein the recess is not closed in a direction perpendicular to the first direction.

In an aspect, when the process cartridge is oriented such that the photosensitive drum and the developing roller are located at a lower end of the process cartridge and the photosensitive drum rotation axis is below the developing roller rotation axis, the recess extends upward to an upper end of the protective cover.

In an aspect, the process cartridge is configured to detachably mount along a mounting direction into an image forming device having a cartridge frame, to be supported in the cartridge frame, and a side of the recess facing the mounting direction is not closed.

In an aspect, the process cartridge further comprises a protective cover located at one end of the process cartridge in the first direction; wherein the protective cover has a hole, and a cutout is provided at a position adjacent to the protective cover; wherein the electrical contact surface and the photosensitive drum are arranged in an up-down direction intersecting the first direction; wherein the cutout extends from an upper end of the protective cover to a lower end of the protective cover in the up-down direction; wherein the process cartridge further comprises a second coupling member configured to receive an external force and to transmit a driving force to the photosensitive drum; and wherein a part of the second coupling member extends through the hole and is exposed to an outside of the process cartridge, and a part of the first coupling member extends through the cutout and is exposed to the outside of the process cartridge.

Disclosed herein is a process cartridge, comprising: a photosensitive drum rotatable about a photosensitive drum rotation axis extending in a first direction; a drum unit comprising the photosensitive drum; a developing roller configured to deposit toner on the photosensitive drum, the developing roller being rotatable about a developing roller rotation axis extending in the first direction; a developing unit comprising the developing roller and being movable relative to the drum unit between a developing position in which the toner is capable of being deposited onto the photosensitive member from the developing roller, and a separation position where at least a part of the developing roller is separated from the photosensitive drum; a first coupling member configured to rotate, and being provided at a first end of the process cartridge in the first direction; a chip having an electrical contact surface; and a retaining component having a protrusion; wherein in the first direction, the protrusion is located at the first end of the process cartridge, and the electrical contact surface is at a second end of the process cartridge separate from the first end in the first direction; wherein the retaining component is rotatably provided at one end of the photosensitive drum and arranged coaxially with the photosensitive drum; and wherein the protrusion abuts the developing unit, thereby maintaining the developing unit in the separation position.

In an aspect, when the process cartridge is oriented such that the photosensitive drum and the developing roller are located at a lower end of the process cartridge and the photosensitive drum rotation axis is below the developing roller rotation axis, the electrical contact surface is located on the drum unit and is above the retaining component.

In an aspect, the retaining component is configured to move relative to the photosensitive drum by receiving a driving force from the developing unit.

In an aspect, the process cartridge further comprises a second coupling member provided at one end of the photosensitive drum, the second coupling member configured to cause the photosensitive drum to rotate by receiving a driving force from an image forming device; wherein the retaining component is rotatably mounted on the second coupling member.

In an aspect, the process cartridge further comprises a second coupling member provided at one end of the photosensitive drum, the second coupling member configured to cause the photosensitive drum to rotate by receiving a driving force from an image forming device; wherein the electrical contact surface is farther away from an extended end of the second coupling member than the retaining component in the first direction.

In an aspect, the process cartridge further comprises a protective cover located at one end of the process cartridge in the first direction, the protective cover having a hole and a recess; wherein the process cartridge further comprises a second coupling member configured to receive an external force and to transmit a driving force to the photosensitive drum; wherein a part of the second coupling member extends through the hole and is exposed to an outside of the process cartridge; wherein the first coupling member is configured to cause the developing roller to rotate; wherein a part of the first coupling member extends through the recess and is exposed to the outside of the process cartridge; and wherein the recess is not closed in a direction perpendicular to the first direction.

In an aspect, when the process cartridge is oriented such that the photosensitive drum and the developing roller are located at a lower end of the process cartridge and the photosensitive drum rotation axis is below the developing roller rotation axis, the recess extends upward to an upper end of the protective cover.

In an aspect, the process cartridge is configured to detachably mount along a mounting direction into an image forming device having a cartridge frame, to be supported in the cartridge frame, and a side of the recess facing the mounting direction is not closed.

In an aspect, the process cartridge further comprises a protective cover located at one end of the process cartridge in the first direction; wherein the protective cover has a hole, and a cutout is provided at a position adjacent to the protective cover; wherein the electrical contact surface and the photosensitive drum are arranged in an up-down direction intersecting the first direction; wherein the cutout extends from an upper end of the protective cover to a lower end of the protective cover in the up-down direction; wherein the process cartridge further comprises a second coupling member configured to receive an external force and to transmit a driving force to the photosensitive drum; wherein a part of the second coupling member extends through the hole and is exposed to an outside of the process cartridge; and wherein the first coupling member is configured to cause the developing roller to rotate, and a part of the first coupling member extends through the cutout and is exposed to the outside of the process cartridge.

The process cartridge disclosed herein may include a separation and contact mechanism. The separation and contact mechanism can force the developing roller and the photosensitive drum to come into contact and separate after receiving external force, and can also maintain the separation state of the developing roller and the photosensitive drum after the external force is removed.

DETAILED DESCRIPTION

Embodiment 1

Figure 1:
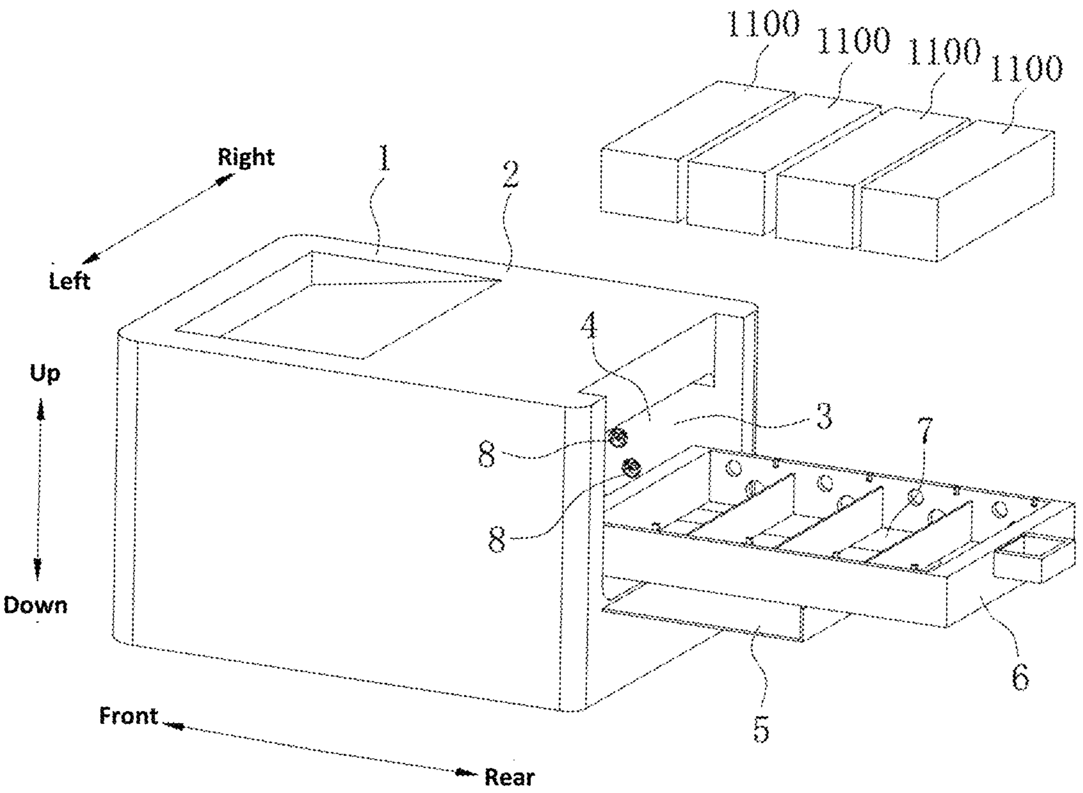
FIG. 1 is a schematic view of an image forming device before a process cartridge is mounted on a tray in Embodiment 1 of the present disclosure.
Figure 2:
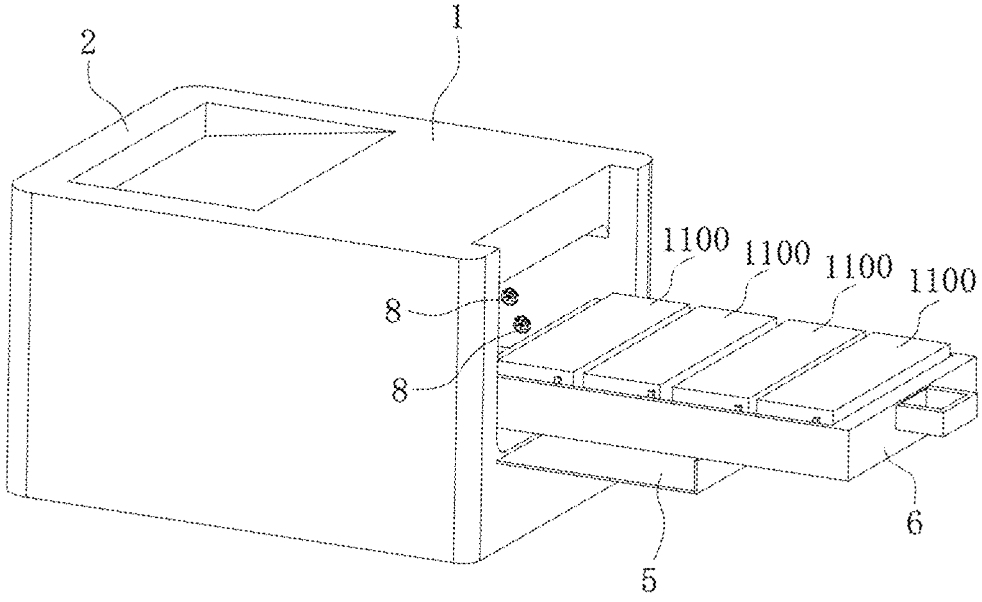
FIG. 2 is a schematic view of the image forming device when the process cartridge is mounted on the tray in Embodiment 1 of the present disclosure.
Figure 3:
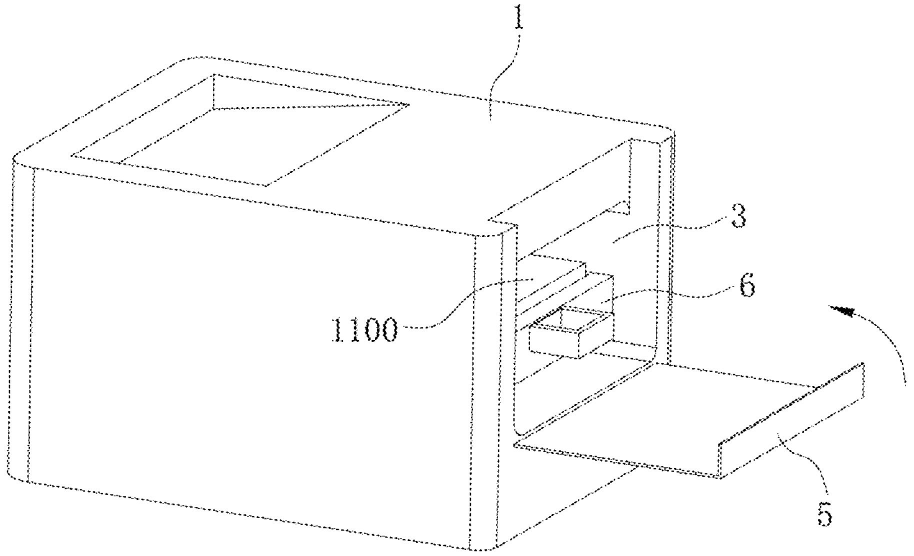
FIG. 3 is a schematic view of the process cartridge and the tray located in the image forming device in the Embodiment 1 of the present disclosure.
Figure 4:
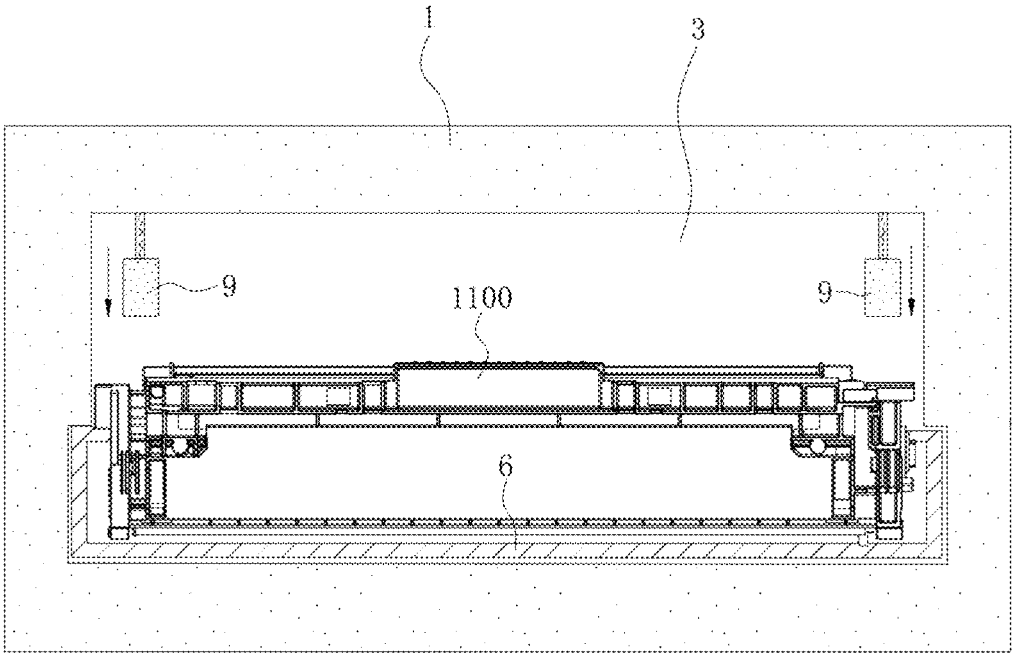
FIG. 4 is a schematic view of the image forming device before a pressing member presses the process cartridge in Embodiment 1 of the present disclosure.
Figure 5:
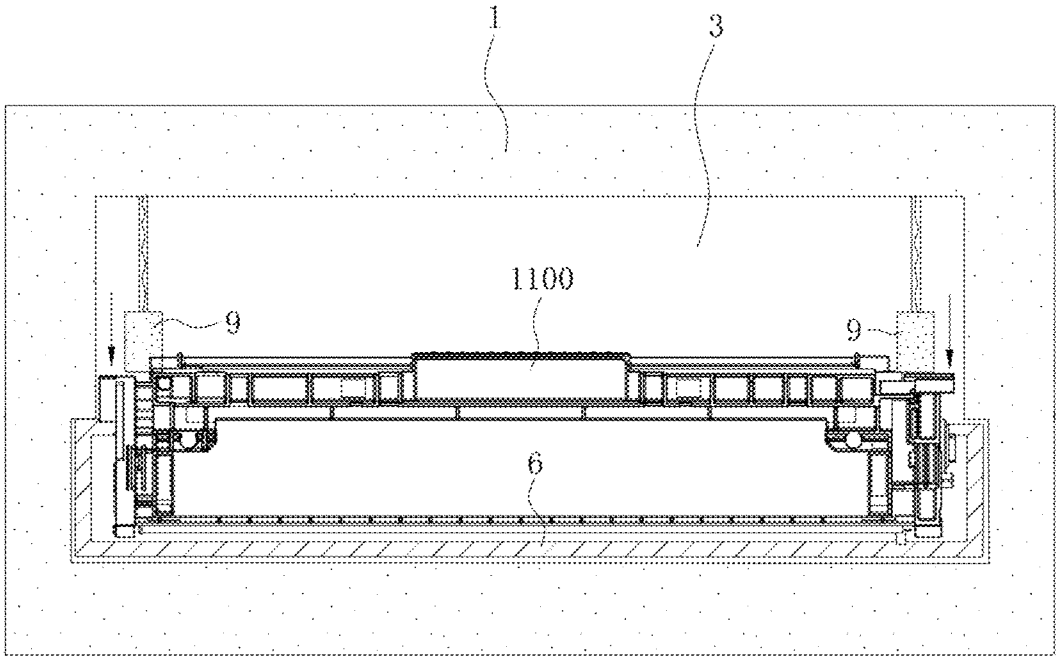
FIG. 5 is a schematic view of the image forming device when the pressing member presses the process cartridge in Embodiment 1 of the present disclosure.
Figure 6:
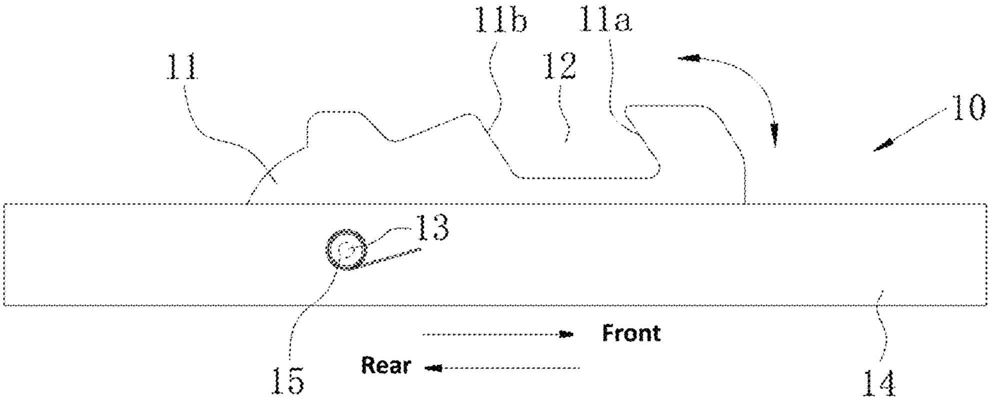
FIG. 6 is a schematic view of a separation control unit of the image forming device in Embodiment 1 of the present disclosure.

As shown in FIGS. 1-14, an image forming device 1 with an electronic photographic forming process and a process cartridge 1100 provided in Embodiment 1 are disclosed. The process cartridge 1100 is detachably mounted in the image forming device 1 and may cooperate with the image forming device 1 to record the content to be displayed on a recording medium (such as paper). Next, the image forming device 1 and the process cartridge 1100 will be separately described in detail with reference to the accompanying drawings.

[General Structure of Image Forming Device]

As shown in FIGS. 1-6, an image forming device 1 is shown. The image forming device 1 is a four-color full-color laser printer using an electronic photographic process and may form a color image on a recording medium. The image forming device 1 includes an outer casing main body 2 and an inner cavity 3 formed in the outer casing main body. The image forming device 1 further has an opening 4 connecting the inner cavity 3 and the outside of the image forming device 1 and a door cover 5 that may cover the opening 4. The door cover 5 may rotate about an axis between an open position exposing the opening 4 and a closed position covering the opening 4, that is, the door cover 5 may be opened or closed. In the following description, with respect to the image forming device 1, a side where the door cover 5 is provided is a rear side, and a side opposite to the rear side is a front side; when viewed from the back, the right side of the image forming device 1 is a right side, the left side is a left side, the top side is an upper side, and the bottom side is a lower side. A tray 6 is further accommodated in the inner cavity 3 of the image forming device 1, and the tray 6 may be inserted into the inner cavity 3 of the image forming device 1 along the direction from rear to front, or pulled out from the inner cavity 3 of the image forming device 1 along the direction from front to rear. Moreover, the tray 6 has four cartridge accommodating portions 7 arranged at intervals in the front-rear direction, and four process cartridges 1100 with substantially the same structure but different colors of toner accommodated therein may be correspondingly mounted in the cartridge accommodating portions 7 and can move with the movement of the tray 6. Four groups of driving members 8 are arranged on the right side of the image forming device 1, and the driving members 8 may receive driving force output by a motor in the image forming device 1 to rotate. When the process cartridge 1100 is mounted in the inner cavity 3 of the image forming device 1, the driving members 8 may be coupled to coupling members 1108 (to be introduced later) in the process cartridge 1100 to drive the process cartridge 1100 to work.

A pair of pressing members 9 are further arranged on the upper side of the inner cavity 3 of the image forming device 1. The pair of pressing members 9 are arranged on the left and right sides of the inner cavity 3, respectively. The pressing members 9 are connected to the door cover 5 through connecting rod members (not shown) and are configured to be movable in an up-down direction in response to the movement of the door cover 5. When the process cartridge 1100 is mounted in the image forming device 1 and the door cover 5 is in the open position, the pressing members 9 are located on the upper side of the process cartridge 1100 and are spaced apart from the process cartridge 1100. When the door cover 5 moves from the open position to the closed position, the pressing members 9 move downward and may press the process cartridge 1100. That is, the pressing members 9 may move upward/downward in response to the opening/closing action of the door cover 5 so as not to hinder the insertion and removal operations of the tray 6 and the process cartridge 1100.

The image forming device 1 further includes separation control units 10. The separation control units 10 control the contact/separation operation of a developing roller (to be described later) and a photosensitive drum (to be described later) by engaging with a part of the process cartridge 1100. The separation control units 10 are arranged at the left and right ends of the lower side of the inner cavity 3 of the image forming device 1, respectively, that is, the separation control units 10 are arranged on a driving side (right side) and a non-driving side (left side) of the image forming device 1. Hereinafter, the separation control units 10 on the left and right sides have almost the same functions, so the separation control units 10 on both sides use the same reference numeral. The separation control units 10 are arranged below the driving members 8 in the up-down direction, and each side of the separation control unit 10 in the left-right direction has separation control members 11 respectively corresponding to four process cartridges 1100. The plurality of separation control members 11 have substantially the same shape. The separation control members 11 are always connected to the image forming device 1, but the separation control members 11 are configured to be movable in the front-rear direction by means of a control mechanism (not shown). Additionally, in order to enable the separation control unit 10 to engage with a part of the process cartridge 1100 and control the contact/separation operation of the developing roller and the photosensitive drum, the separation control unit 10 remains overlapped with the part of the process cartridge 1100 in the up-down direction. More specifically, the separation control unit 10 includes the separation control member 11 described above. The separation control member 11 has a first force applying surface 11*a* and a second force applying surface 11*b* protruding toward the process cartridge 1100 (i.e., the upper side) and facing each other across a space 12. The first force applying surface 11*a* and the second force applying surface 11*b* are connected to each other through a connecting part (not shown) on the lower side of the main assembly of the image forming device 1. Additionally, the separation control member 11 is usually pushed upward by a push spring 15 and supported by a controlled metal plate 14 that is rotatable about a rotation center 13, and the control metal plate 14 is configured to move in the front-rear direction by a control mechanism (not shown), so that the separation control member 11 is configured to be movable in the front-rear direction.

[Process Cartridge]

Next, the process cartridge 1100 in Embodiment 1 of the present disclosure will be described in detail with reference to FIGS. 1-14. As described above, the process cartridge 1100 can be detachably mounted in the tray 6 and can be mounted in the inner cavity 3 of the image forming device 1 together with the tray 6. For convenience of description below, in the following description, the length direction of the process cartridge 1100 is the left-right direction (first direction), and the coupling member 1108 is arranged at the right end (first end) of the process cartridge 1100 in the left-right direction. Moreover, as known above, it is defined that the process cartridge 1100 can be mounted in the image forming device 1 along the direction from rear to front (second direction), and the up-down direction (third direction) is perpendicular to the left-right direction and the front-rear direction.

Figure 7:
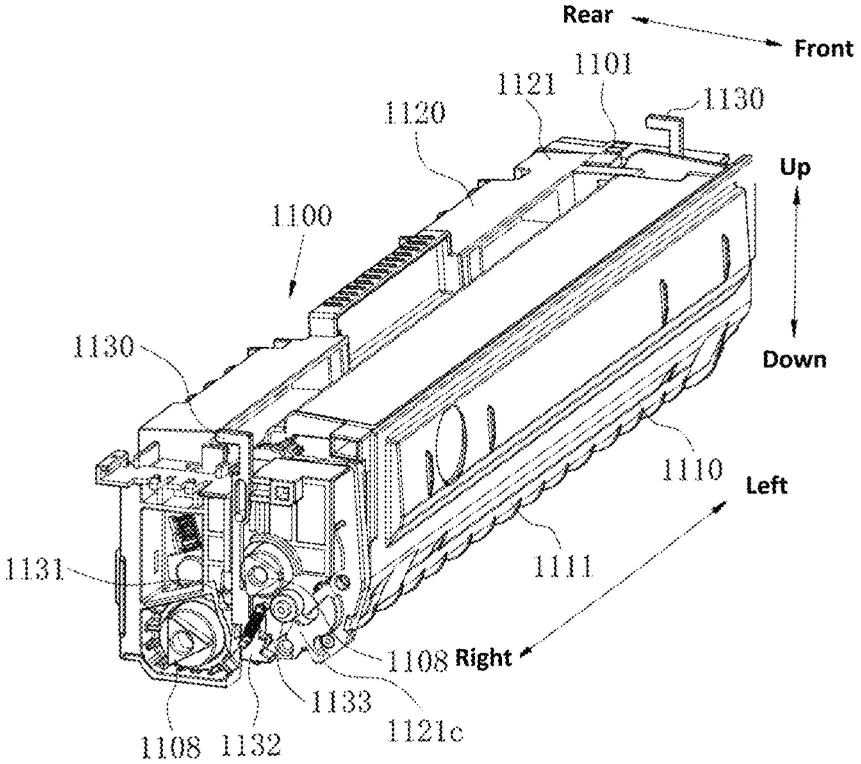
FIG. 7 is a schematic view of the process cartridge in Embodiment 1 of the present disclosure when viewed from an angle.
Figure 8:
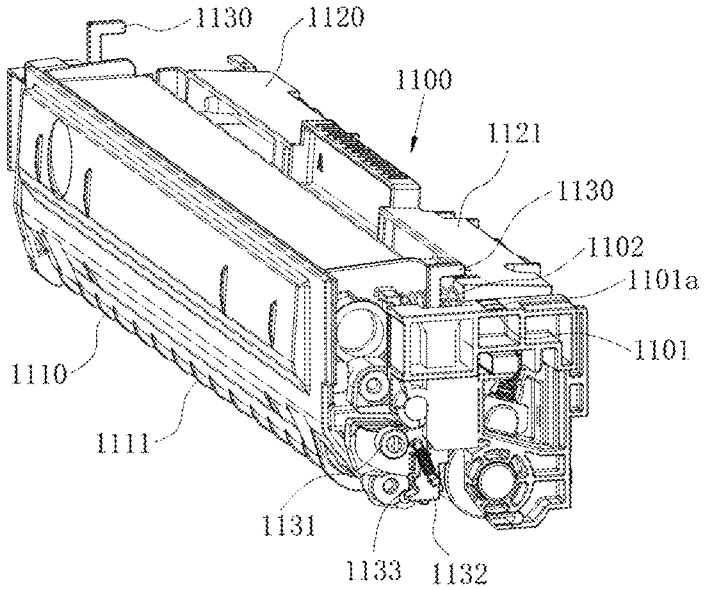
FIG. 8 is a schematic view of the process cartridge in Embodiment 1 of the present disclosure when viewed from another angle.
Figure 9:
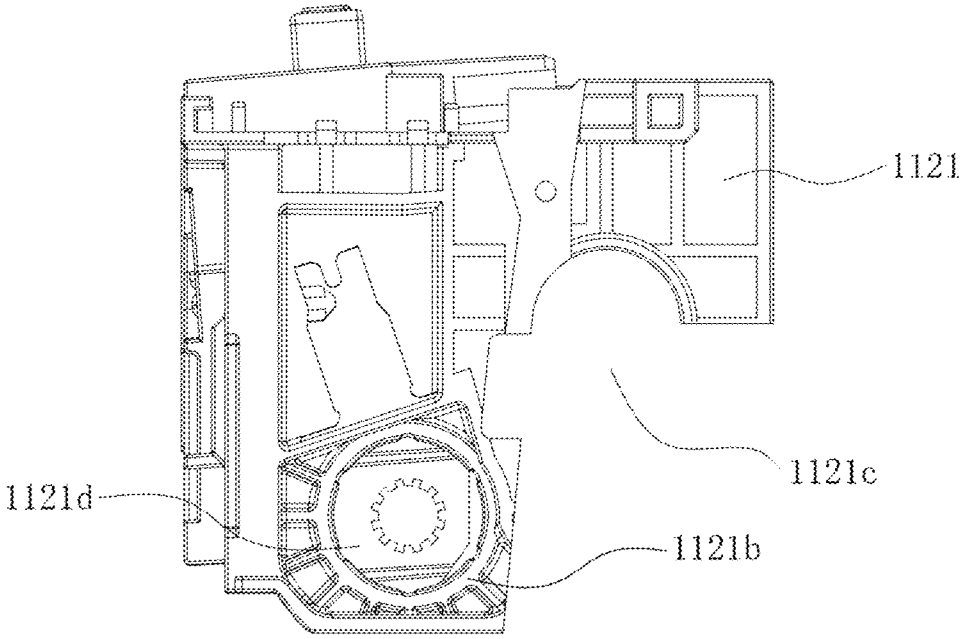
FIG. 9 is a schematic view of a protective cover of the process cartridge in Embodiment 1 of the present disclosure.
Figure 10:
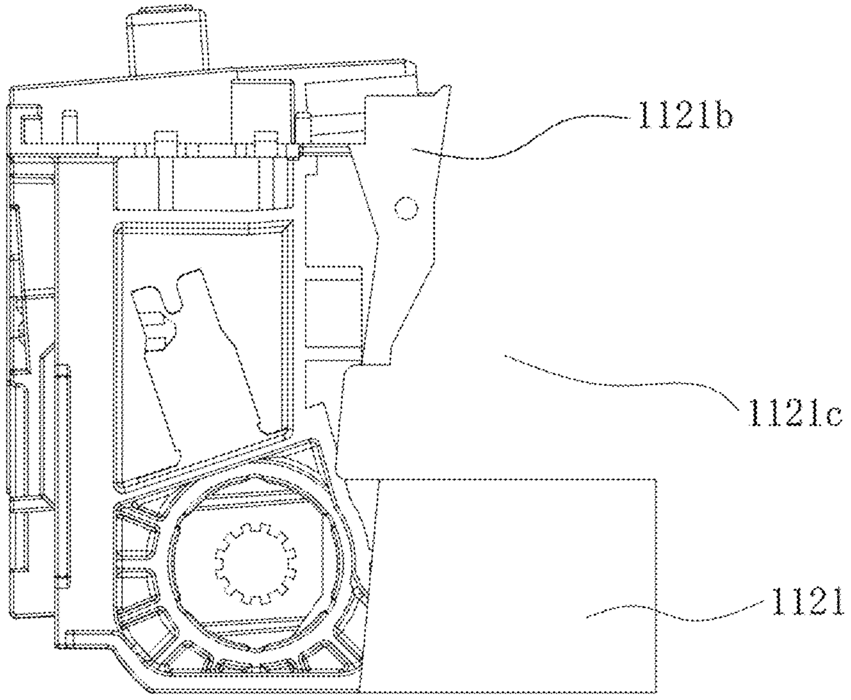
FIG. 10 is a schematic view of another implementation of the protective cover of the process cartridge in Embodiment 1 of the present disclosure.
Figure 11:
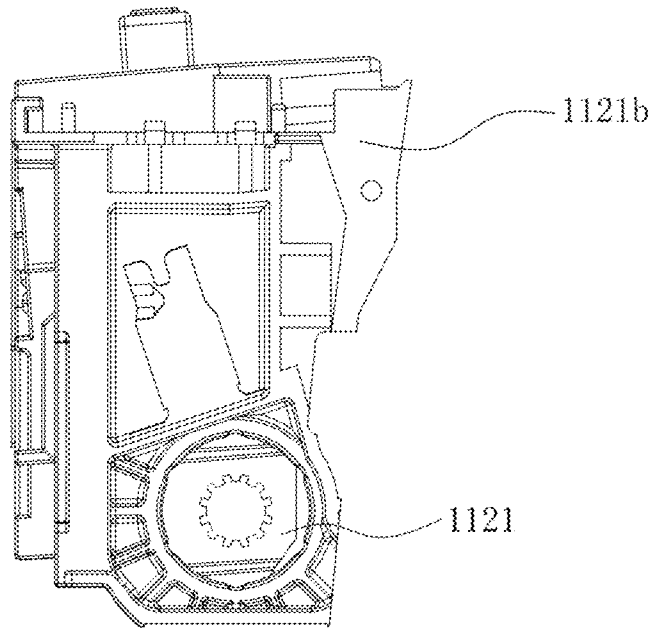
FIG. 11 is a schematic view of still another implementation of the protective cover of the process cartridge in Embodiment 1 of the present disclosure.
Figure 12:
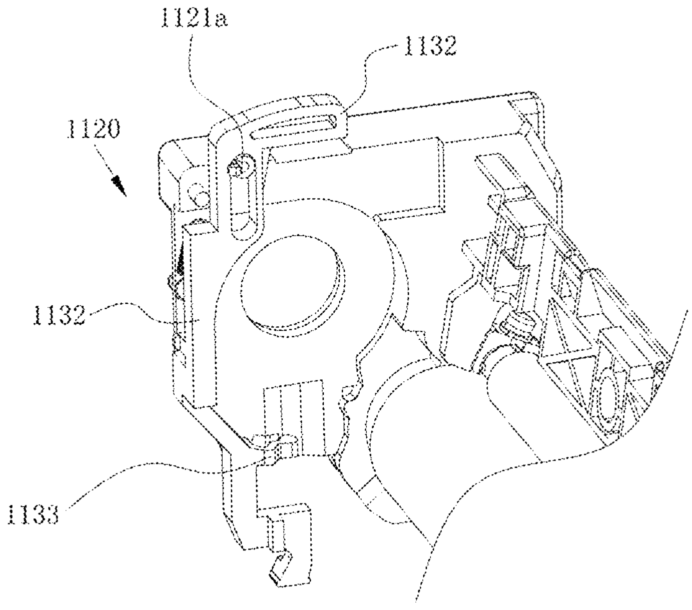
FIG. 12 is a schematic view of a drum unit in Embodiment 1 of the present disclosure.
Figure 13:
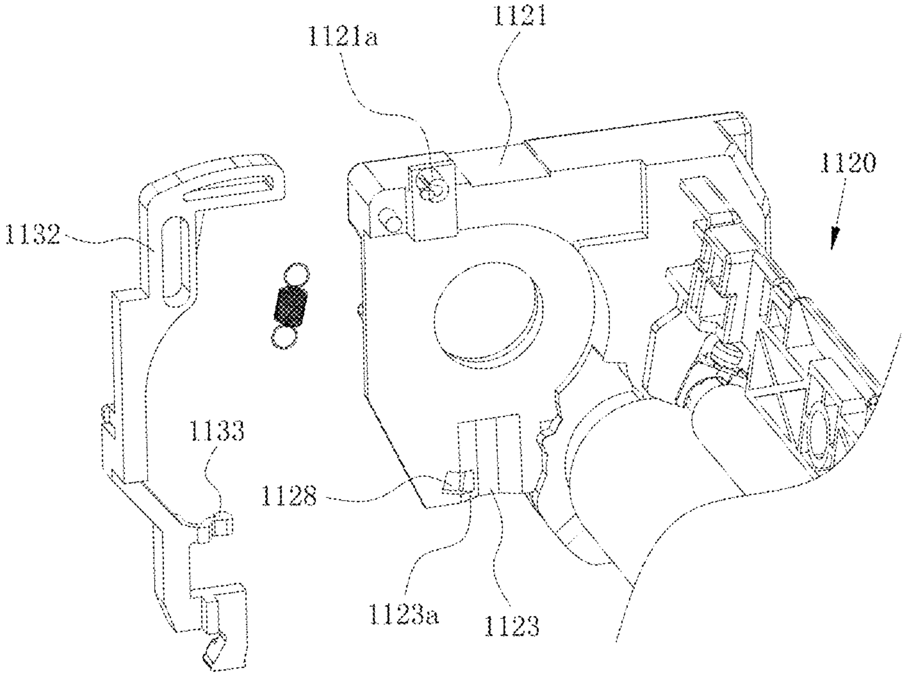
FIG. 13 is an exploded schematic view of the drum unit in Embodiment 1 of the present disclosure.
Figure 14:
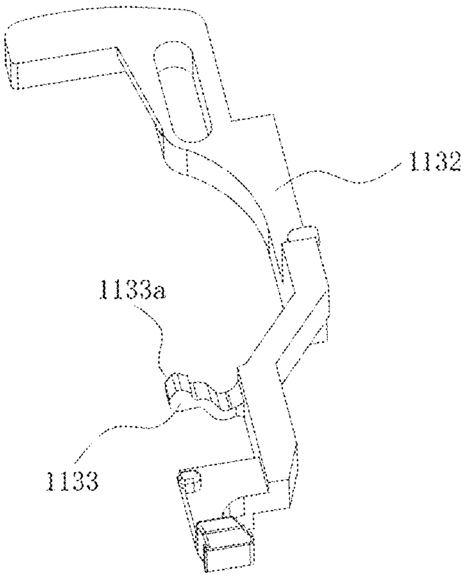
FIG. 14 is a schematic view of a force receiving member in Embodiment 1 of the present disclosure.
Figure 15:
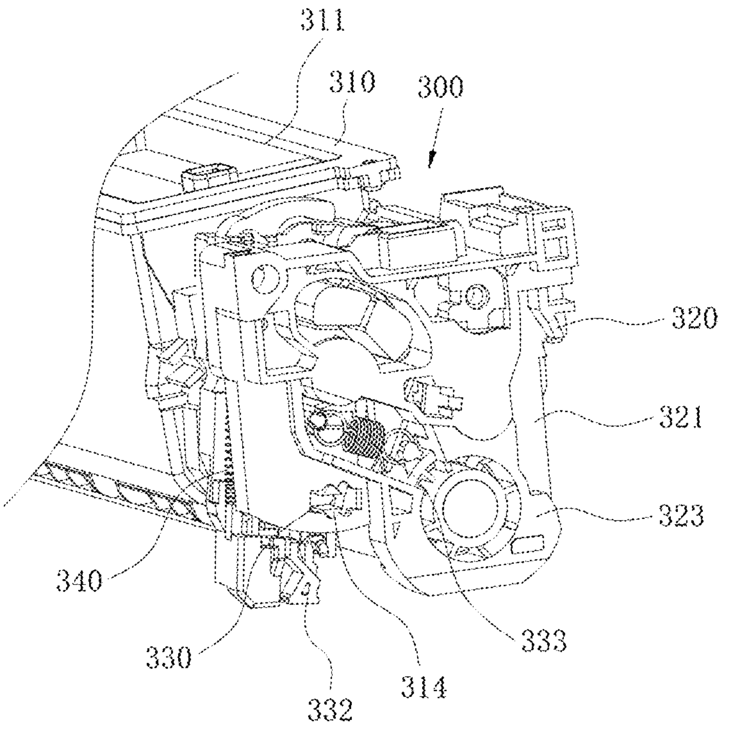
FIG. 15 is a schematic view of a process cartridge in Embodiment 2 of the present disclosure when viewed from an angle.
Figure 16:
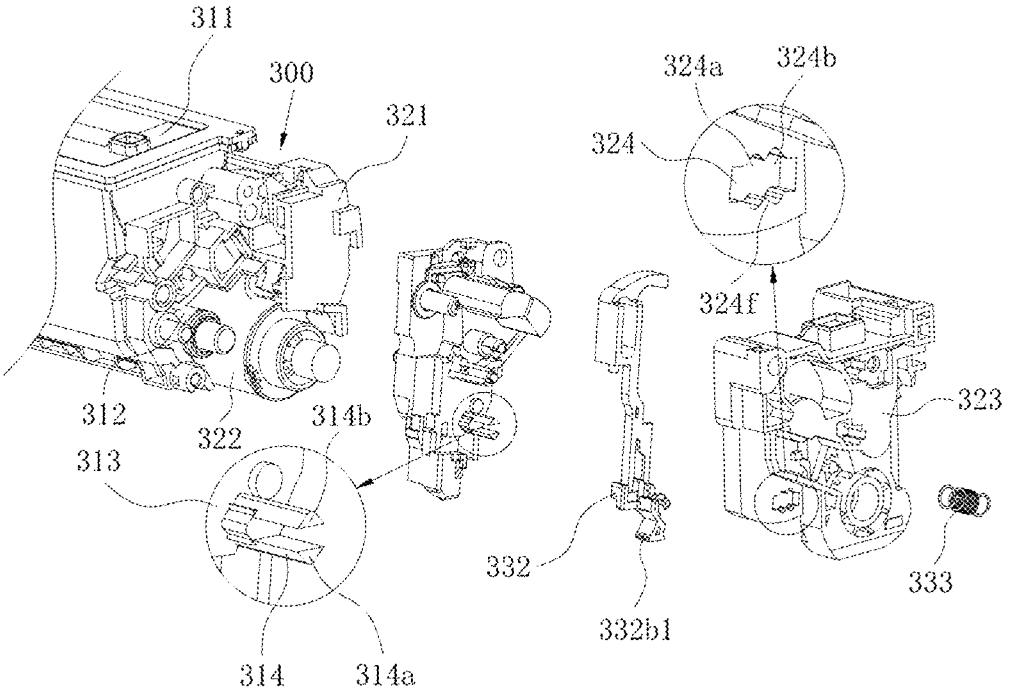
FIG. 16 is an exploded schematic view of a separation and contact mechanism of the process cartridge in Embodiment 2 of the present disclosure.
Figure 17:
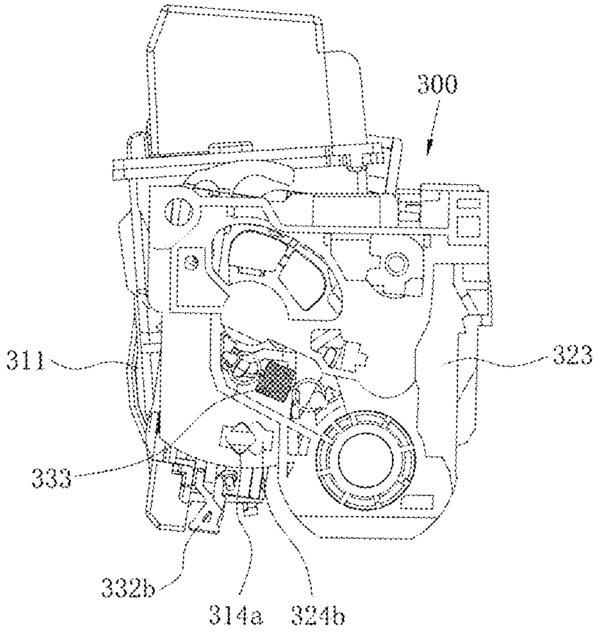
FIG. 17 is a schematic view of the process cartridge in Embodiment 2 of the present disclosure when viewed from another angle.

The process cartridge 1100 includes a developing unit 1110 and a drum unit 1120 connected to each other, and the developing unit 1110 is configured to be capable of swinging relative to the drum unit 1120. The developing unit 1110 includes a developing frame 1111 that can accommodate toner and a developing roller supported on the developing frame 1111, and the developing roller is rotatable about a developing roller rotation axis extending in the left-right direction. The drum unit 1120 includes a drum frame 1121 and a photosensitive drum supported on the drum frame 1121, and the photosensitive drum is rotatable about a photosensitive drum rotation axis extending in the left-right direction. A protective cover 1121*b* is arranged at the right end of the drum frame 1121, and the protective cover 1121*b* may be used to support the developing unit 1110. The protective cover 1121*b* is provided with a hole 1121*d* through which at least a part of the coupling member for driving the photosensitive drum to rotate may pass, so as to receive the driving force of the image forming device to rotate. The protective cover 1121*b* is further provided with a recess 1121*c* (also referred to as a notch), and the recess 1121*c* is connected to the outside of the process cartridge 1100 in a direction perpendicular to the left-right direction. In other words, in the direction perpendicular to the left-right direction, the recess 1121*c* is not closed, that is, the recess 1121*c* is not a closed hole structure. The coupling member 1108 for driving the developing roller to rotate is exposed to the outside of the process cartridge 1100 through the recess 1121*c*, so that when the developing unit 1110 is assembled to the drum unit 1120, it can be mounted on the drum unit 1120 along a direction perpendicular to the first direction, thereby preventing the coupling member 1108 for driving the developing roller to rotate from interfering with the protective cover 1121*b* during the assembly process of the developing unit 1110, which can significantly improve the assembly efficiency of the developing unit 1110 and the drum unit 1120. Further, the recess 1121*c* may be of a structure in which its front end and lower end are communicated with the outside of the process cartridge 1100, as shown in FIG. 7 or 9, or a structure in which one of the front end or the rear end of the recess 1121*c* is communicated with the outside of the process cartridge 1100. Alternatively, the recess 1121*c* may be a structure in which its front end and upper end are communicated with the outside of the process cartridge 1100, as shown in FIG. 10, or a structure in which one of the front end or the upper end of the recess 1121*c* is communicated with the outside of the process cartridge 1100. Moreover, a structure in which the recess is eliminated as shown in FIG. 11 is also possible, that is, the front end of the protective cover 1121*b* has substantially no structure, or no structure at all, of the above recess, in other words, the front end of the protective cover 1121*b* has an open space 1121*e* that extends from an upper end of the protective cover to a lower end of the protective cover 1121*b* in the up-down direction, in other words, a cutout is provided at a position adjacent to the protective cover 1121*b*, wherein the cutout extends from an upper end of the protective cover 1121*b* to a lower end of the protective cover in the up-down direction; which can further avoid the coupling member 1108 and significantly improve the efficiency of assembling the developing unit 1110 to the drum unit 1120. Therefore, the structure of the protective cover 1121*b* in this embodiment is not limited.

A spring 1102 is connected between the developing frame 1111 and the drum frame 1121. The elastic force generated by the deformation of the spring 1102 may be applied to the developing frame 1111 and the drum frame 1121, and the spring 1102 is arranged to allow the developing roller and the photosensitive drum to maintain close contact, so as to ensure that when the process cartridge 1100 is mounted in the image forming device 1 and is in a working state, the developing roller can accurately convey and deposit the toner carried on the developing roller onto the photosensitive drum through contact with the photosensitive drum, thereby developing an electrostatic latent image on the photosensitive drum and outputting a toner image. Coupling members 1108 are arranged at both the right end of the developing unit 1110 and the right end of the drum unit 1120. The coupling members 1108 may be coupled to the driving members 8 of the image forming device 1, and can receive rotational driving force output by the driving members 8 to rotate. When viewed from right to left, the coupling members 1108 are driven to rotate in a clockwise direction, and the coupling members 1108 may drive the developing roller and the photosensitive drum to rotate, respectively. Not only that, but the process cartridge 1100 further includes a storage unit 1101 and a storage unit frame (not shown) for mounting the storage unit 1101. The storage unit 1101 has an electrical contact surface 1101*a* arranged at the upper end of the left side of the process cartridge 1100. The electrical contact surface 1101*a* and the photosensitive drum are arranged in the up-down direction, the electrical contact surface 1101*a* is arranged at the upper end of the drum frame 1121 in the up-down direction, and the electrical contact surface 1101*a* may be electrically connected to the image forming device 1 so that the storage unit 1101 can establish a communication connection with the electrophotographic image forming device 1. Therefore, the information of the process cartridge 1100 stored in the storage unit 1101, such as the model, developer capacity, etc., can be read by the image forming device 1. It is worth mentioning that one of the pressing members 9 may press and position the storage unit frame to ensure the stability of the electrical connection between the storage unit 1101 and the image forming device 1.

In order to ensure that the developing roller of the developing unit 1110 and the photosensitive drum of the drum unit 1120 are in contact with each other when the process cartridge 1100 is working, and the developing roller of the developing unit 1110 and the photosensitive drum of the drum unit 1120 are separated from each other when the process cartridge 1100 is not working, the process cartridge 1100 further includes separation and contact mechanisms for causing the developing roller and the photosensitive drum to come into contact with each other or separate from each other. Preferably, the separation and contact mechanisms are movably supported by the developing unit 1110 (of course, the separation and contact mechanisms may also be arranged on the drum unit 1120) and are arranged on the left and right sides of the process cartridge 1100, respectively, which will make the left and right sides of the process cartridge 1100 relatively balanced in force, and make the developing roller and the photosensitive drum more stable when coming into contact or separating. In the following description, when the developing roller and the photosensitive drum are in contact with each other, the developing unit 1110 is in a developing position, and when the developing roller and the photosensitive drum are separated from each other, the developing unit 1110 is in a separation position. Moreover, it is worth mentioning that the separation and contact mechanisms on the left and right sides of the process cartridge 1100 have almost the same structure and function, so the separation and contact mechanisms on the left and right sides use the same reference numeral; furthermore, precisely because the two are generally the same in structure and function, the separation and contact mechanism on the right side will be taken as an example to introduce them in detail, and the separation and contact mechanism on the left side will not be described again.

The separation and contact mechanism at the right end of the process cartridge includes a force receiving member 1132. The force receiving member 1132 is movably mounted on the drum frame 1121 through a connecting part 1121*a* configured as an elastic buckle structure. Optionally, the force receiving member 1132 may also be mounted on the developing frame, which is not a limitation. When the door cover 5 of the image forming device 1 is closed, the pressing member 9 of the image forming device 1 moves downward and presses the upper end of the force receiving member 1132, so that the force receiving member 1132 moves from top to bottom to a position that allows it to receive pushing force of the separation control member 11. The lower end of the force receiving member 1132 may receive the pushing force from the separation control member 11 in the image forming device 1 and move in a direction intersecting the left-right direction. Moreover, a restricted portion 1133 that is bendable and elastically deformable is provided on the lower side of the force receiving member 1132. The restricted portion 1133 is configured to extend outward from the lower side surface of the force receiving member 1132, and is integrally molded with the force receiving member 1132 to simplify its structure and reduce the number of required molds, thereby reducing production costs. A first restricted part 1133*a* is provided at the extended end of the restricted portion 1133, and the first restricted portion 1133*a* may be inserted into a first restricting portion 1128 of the drum frame 1121 that is configured as a groove or a hole, so that the developing roller and the photosensitive drum are stably maintained in a separated state.

Optionally, the restricted portion 1133 may be a spring sheet or steel sheet that is elastically deformable, or a component that is elastically movable. As long as the restricted portion 1133 can move after being subjected to force and can be reset after the force is removed, the structure of the restricted portion 1133 is not limited.

Contact and Separation Process Between Developing Roller and Photosensitive Drum Taking the right end of the process cartridge as an example, after the process cartridge is mounted in the image forming device 1 and the door cover 5 is closed, the pressing member 9 of the image forming device 1 moves from top to bottom in response to the closing of the door cover 5, and the pressing member 9 presses the force receiving member 1132 downward from the first position to the second position. Subsequently, the separation control member 11 pushes the lower end of the force receiving member 1132 forward, and the force receiving member 1132 pushes an urged protrusion of the developing unit 1110, so that the developing unit 1110 swings relative to the drum unit 1120. During the swinging process of the developing unit 1110, the restricted portion 1133 connected to the force receiving member 1132 may be elastically deformed, so that the first restricted part 1133*a* may enter the first restricting portion 1128 through the guidance of an inclined surface 1123*a*, and the restricted portion 1133 is reset and stably maintained in the first restricting portion 1128. At this time, the restricted portion 1133 is locked, which prevents the elastic force generated by the spring 1102 of the process cartridge from being applied to the developing unit 1110 to move the developing roller to the developing position.

When the process cartridge needs to execute a printing task again, that is, the developing roller needs to move from the separation position to the developing position, the separation control member 11 of the image forming device 1 may push the lower end of the force receiving member 1132 backward, forcing the lower end of the force receiving member 1132 to swing in the front-rear direction toward the direction close to the photosensitive drum. During the swinging process of the force receiving member 1132, the restricted portion 1133 is elastically deformed again and disengaged from the contact with the first restricting portion 1128. At the moment of disengagement, the developing unit 1110 may move toward the direction close to the drum unit 1120 under the action of the elastic force of the spring 1102, and the developing roller moves from the separation position to the developing position. Finally, the developing roller maintains close contact with the photosensitive drum. At this time, the first restricted part 1133*a* is accommodated in an accommodating groove 1123 and is spaced apart from the drum frame 1121.

Embodiment 2

Next, a process cartridge 300 in Embodiment 2 of the present disclosure will be described in detail with reference to FIGS. 15-20. The process cartridge 300 has the same parts as the process cartridge in the above embodiment. For example: the separation and contact mechanism 330 includes a force receiving member 332 having substantially the same function and structure as the force receiving member in the above embodiment, and a first elastic member 340 arranged between the developing frame 311 and the force receiving member 332, which may be used to maintain the force receiving member 332 in the first position when the force receiving member 332 is not subjected to the external force from the process cartridge 300, and to reset the force receiving member 332 from the second position to the first position after the external force from the process cartridge 300 is removed; the process cartridge further includes a spring 333 connected between the developing frame 311 and the drum frame 321, and the elastic force provided by the spring 333 may maintain the developing roller 312 and the photosensitive drum 322 in a close contact state when the process cartridge 300 is not subjected to the external force. For other identical parts of the process cartridge, they will not be described in detail here. The difference of the process cartridge 300 is that the separation and contact mechanism 330 on the process cartridge 300 is different.

The force receiving member 332 of this embodiment is movably arranged on the developing unit 310 relative to the developing frame 311. Optionally, the force receiving member 332 may still be arranged on the drum unit 320. Not only that, but the process cartridge 300 further includes a bearing cover 313 arranged at one end of the developing frame 311 in the length direction. The bearing cover 313 is used to rotatably support the developing roller 312 and the coupling member. In the following description, the bearing cover 313 may exist as a part of the developing frame 311, that is, the developing frame 311 includes the bearing cover 313. The process cartridge 300 further includes a restricted part 314 arranged on the bearing cover 313 and protruding outward from the outer surface of the bearing cover 313. The restricted part 314 may move between a first position and a second position relative to the drum frame 321 in response to the movement of the force receiving member 332. When the restricted part 314 is in the first position, the developing roller 312 and the photosensitive drum 322 remain separated. When the restricted part 314 is in the second position, the developing roller maintains contact with the photosensitive drum 322. Specifically, the restricted part 314 is configured as a pair of protrusions that are spaced apart and face each other, namely, a first protrusion 314*a* and a second protrusion 314*b*. The first protrusion 314*a* and the second protrusion 314*b* may be elastically deformed and moved after being subjected to a force, and can be relatively close to or away from each other. That is to say, the restricted part 314 is an elastic protrusion. When not subjected to an external force, the first protrusion 314*a* and the second protrusion 314*b* are far away from each other. When subjected to an external force, the first protrusion 314*a* and the second protrusion 314*b* can be close to each other. Correspondingly, a protective cover 323 is further provided at one end of the process cartridge 300, and the protective cover 323 covers at least a part of the bearing cover 313. In the following description, the protective cover 323 may exist as a part of the drum frame 321, that is, the drum frame 321 includes the protective cover 323. A restricting portion 324 configured as a groove is provided on the protective cover 323. The restricting portion 324 includes a first restricting portion 324*a* and a second restricting portion 324*b* that are adjacently arranged and communicated with each other. The first restricting portion 324*a* is closer to the front end of the process cartridge 300 in the front-rear direction than the second restricting portion 324*b*. In this embodiment, the first restricting portion 324*a* is also referred to as a first groove 324*a*, and the second restricting portion 324*b* is also referred to as a second groove 324*b*. The second groove 324*b* includes a notch connecting the first groove 324*a*, and the maximum width of the first groove 324*a* is greater than the width of the notch, so that the restricted part 314 can be blocked by the notch and maintained in the first position when not subjected to an external force. As one of preferred implementations, when viewed along the left-right direction, the restricting portion 324 is in a "gourd" shape, that is, along the direction from the first restricting portion 324*a* to the second restricting portion 324*b*, the width of the first restricting portion 324*a* is wider, and the width becomes narrower when passing through the notch, and then becomes wider again when passing through the second restricting portion 324*b*. When the restricted part 314 is located at the first position, the restricted part 314 is inserted into the first restricting portion 324*a*, and the first protrusion 314*a* and the second protrusion 314*b* of the restricted part 314 are away from each other and are in an expanded state. Even at this time, under the action of the elastic force of the spring 333, the developing unit 310 has a movement tendency to move from the separation position to the developing position. However, since the first protrusion 314*a* and the second protrusion 314*b* of the restricted part 314 are open and the width of the notch between the first restricting portion 324*a* and the second restricting portion 324*b* is small, the restricted part 314 is blocked by the notch, preventing it from sufficiently passing over the notch. Therefore, the developing unit 310 can stably maintain the separation position shown in FIG. 18 when the process cartridge 300 is not subjected to an external force. When the restricted part 314 is located at the second position, the restricted part 314 is inserted into the second restricting portion 324*b*, and at this time, the developing roller 312 and the photosensitive drum 322 maintain contact.

Of course, the notch described above may also be understood as being formed by a pair of blocking protrusions that are spaced apart, that is, the notch is configured as a passage between the pair of blocking protrusions. The blocking protrusion may block the limited part 314 from moving from the first position to the second position after the limited part 314 is in the first position and the external force applied to the urged surface of the force receiving member 332 is removed, so as to maintain the separation state of the developing roller 312 and the photosensitive drum 322. Further, an inclined surface 324*f* is provided on at least one of the blocking protrusion of the restricting portion 324 and the restricted part 314, and the inclined surface 324*f* may be used to guide the limited part 314 to move from the first position to the second position, or to guide the limited part 314 to move from the second position to the first position. Preferably, the restricting portion 324 and the restricted part 314 are each provided with an inclined surface 324*f*, so as to guide the limited part 314 more smoothly and avoid problems such as jamming.

Figure 18:
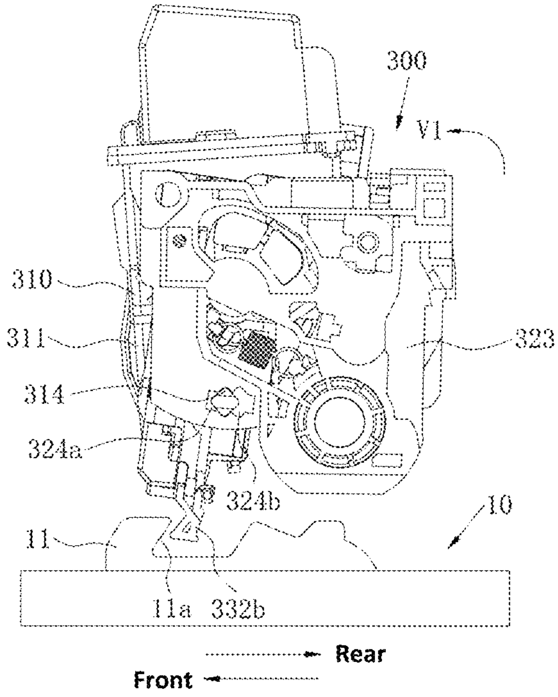
FIG. 18 is a schematic view of a developing unit of the process cartridge located in a developing position in Embodiment 2 of the present disclosure.
Figure 19:
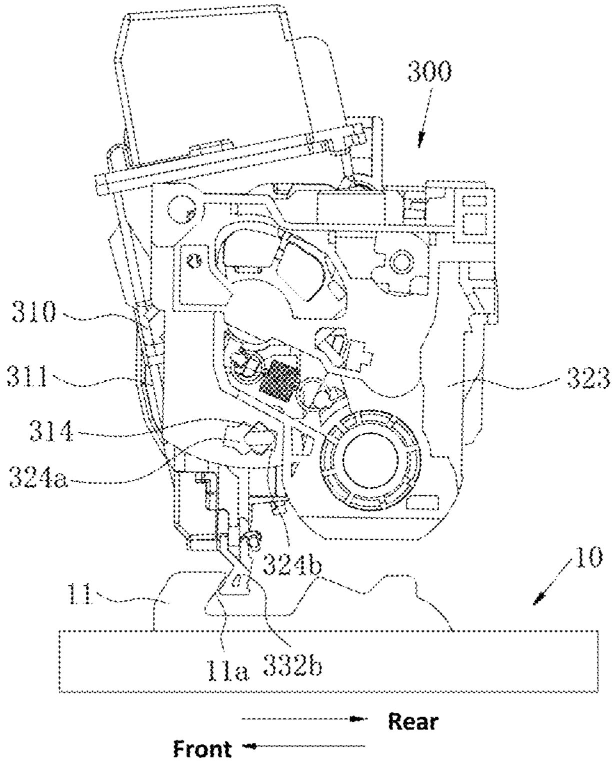
FIG. 19 is a schematic view of the developing unit of the process cartridge located in a separation position in Embodiment 2 of the present disclosure.
Figure 20:
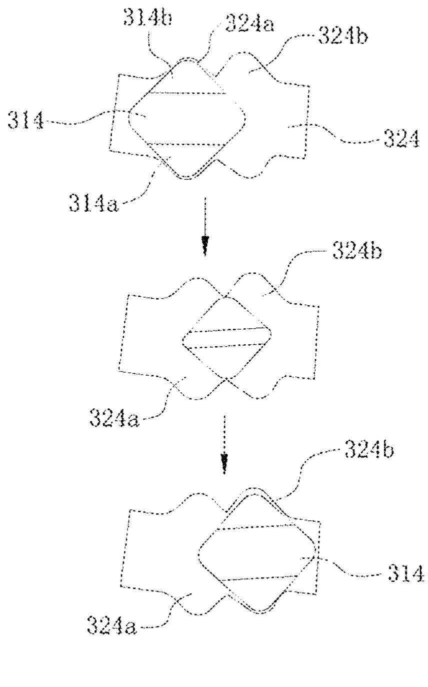
FIG. 20 is a schematic view of a movement process of a restricted portion in a restricting portion during the process of the developing unit moving from the developing position to the separation position in Embodiment 2 of the present disclosure.
Figure 21:
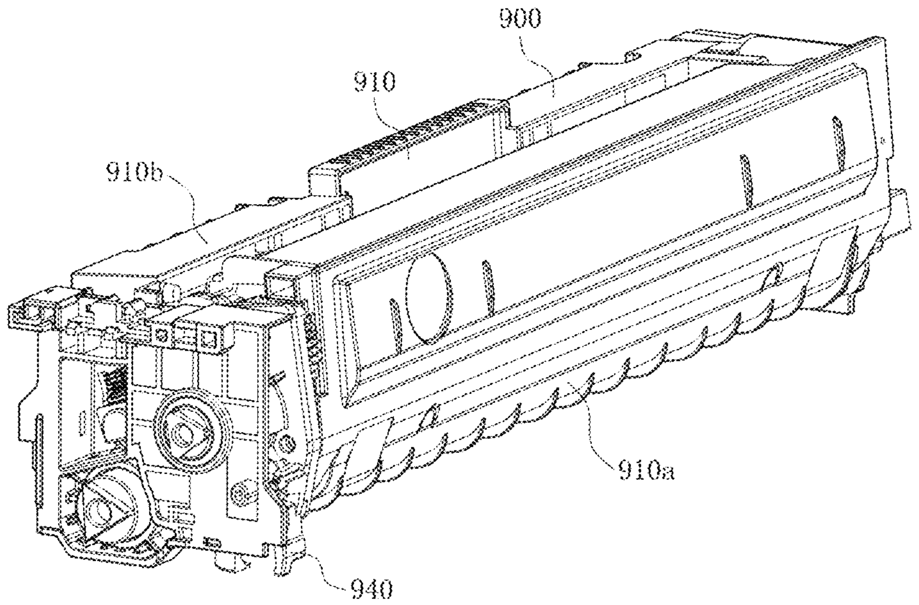
FIG. 21 is a schematic view of a process cartridge in Embodiment 3 of the present disclosure.
Figure 22:
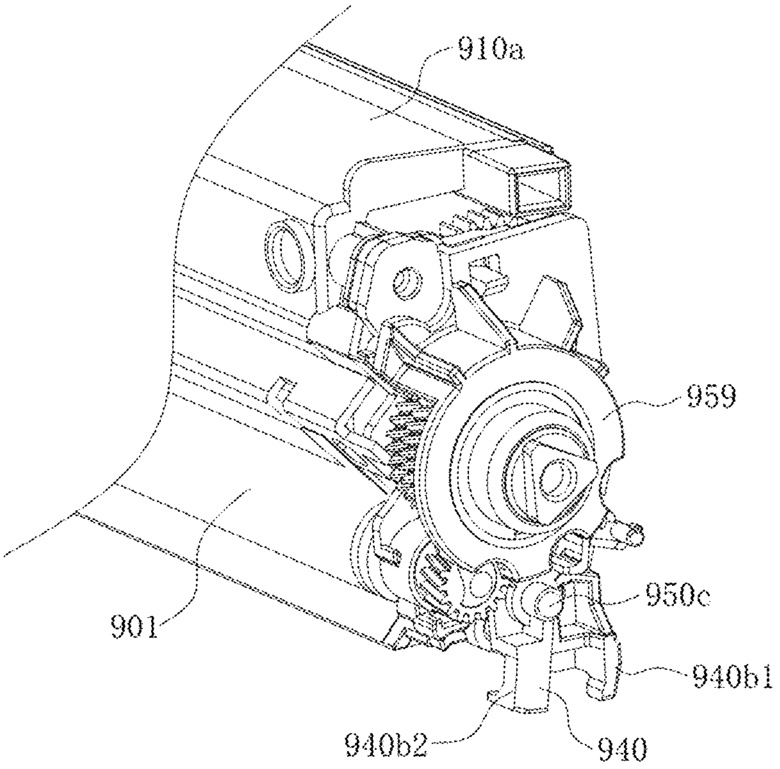
FIG. 22 is a schematic view of a limiting protrusion located on a first casing in Embodiment 3 of the present disclosure.
Figure 23:
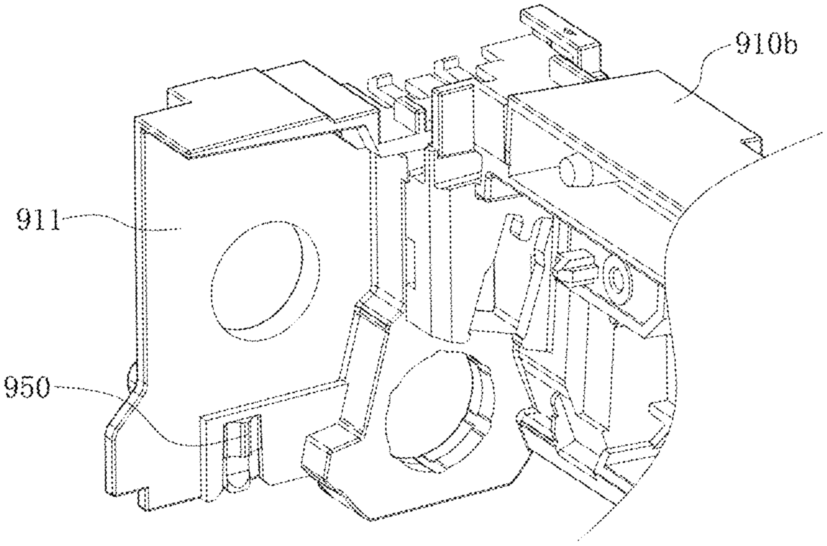
FIG. 23 is a schematic view of a retaining protrusion mounted on a second casing in Embodiment 3 of the present disclosure when viewed from an angle.
Figure 24:
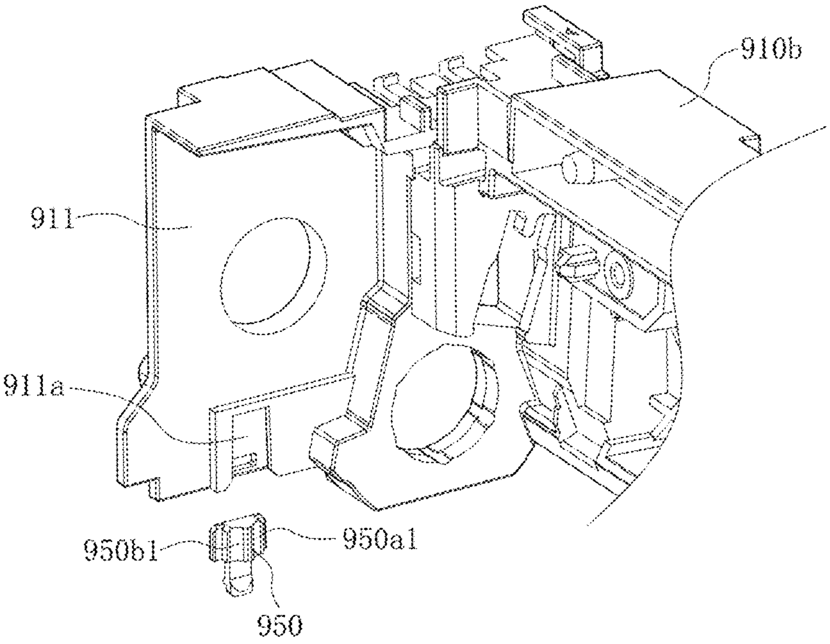
FIG. 24 is a schematic view of the retaining protrusion separated from the second casing in Embodiment 3 of the present disclosure.
Figure 25:
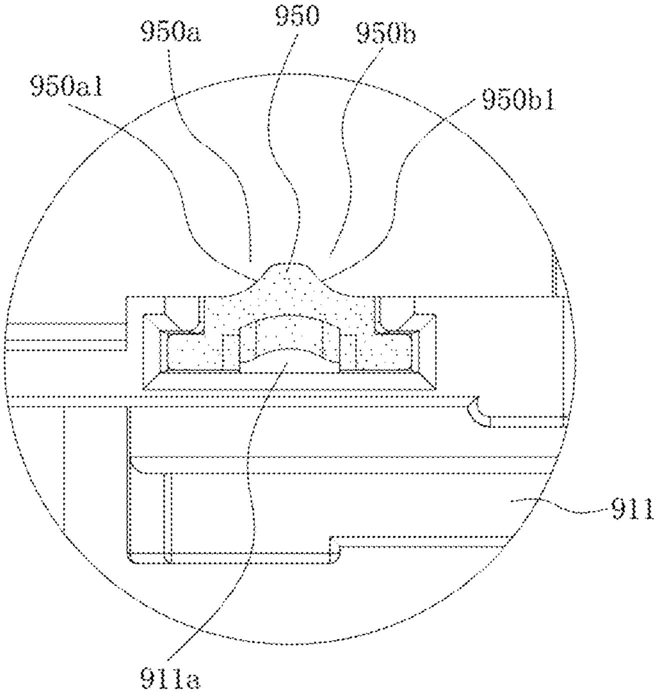
FIG. 25 is a schematic view of the retaining protrusion mounted on the second casing in Embodiment 3 of the present disclosure when viewed from another angle.

When the process cartridge 300 is mounted in the image forming device 1 and the first urged surface 332b1 of the force receiving member 332 is urged backward by the first force applying surface 11*a* of the separation control member 11, the force receiving member 322 drives the developing unit 310 to swing along a V1 direction of FIG. 18. At this time, the engagement state of the restricted part 314 engaged with the first restricting portion 324*a* of the restricting portion 324 is broken, and the restricted part 314 in the first position on the developing unit 310 will be disengaged from the first restricting portion 324*a* of the restricting portion 324 on the drum frame 321, and may gradually pass over the notch between the first restricting portion 324*a* and the second restricting portion 324*b*. Specifically, in the process of passing over the notch between the first restricting portion 324*a* and the second restricting portion 324*b*, due to the small size of the notch, at this time, the first protrusion 314*a* and the second protrusion 314*b* of the restricted part 314 are squeezed by the inner wall of the notch of the restricting part 324 and deformed to approach each other to allow the restricted part 314 to pass through. Finally, the first protrusion 314*a* and the second protrusion 314*b* approaching each other pass over the notch and move to the second restricting portion 324*b*. At this time, the first protrusion 314*a* and the second protrusion 314*b* of the restricted part 314, which are no longer squeezed, move away from each other and present an expanded state under the reset of their own elastic force. Finally, the restricted part 314 moves to the second position and is in the second restricting portion 324*b* of the restricting portion 324. At this time, the developing unit 310 is in the developing position. Subsequently, the separation control member 11 moves forward and no longer pushes the force receiving member 332. Under the elastic force of the spring 333 of the process cartridge 300, the developing roller 312 and the photosensitive drum 322 maintain a stable close contact state. The movement process of the process cartridge 300 in which the developing unit 310 moves from the developing position to the separation position is substantially opposite to the movement process of the developing unit 310 from the separation position to the developing position, and will not be described in detail here.

In this embodiment, the separation and contact mechanism 330 of the process cartridge 300 is provided with the limited part 314 and the limiting portion 324. When the developing unit 310 is in the developing position or the separation position, even if the pushing force of the separation control member 11 is no longer applied to the force receiving member 332, the limited part 314 can be engaged with the limiting portion 324 to stably maintain the contact or separation state of the developing roller 312 and the photosensitive drum 322. Compared with the prior art in which a movable separation holding member is provided, in this embodiment, the structure of the separation and contact mechanism 330 of the process cartridge 300 is greatly simplified, and the production cost of the process cartridge 300 is reduced.

Embodiment 3

As shown in FIGS. 21-27, a process cartridge 900 of Embodiment 3 in the present disclosure is shown. The parts of the process cartridge 900 that are the same as those of the process cartridges of the above-mentioned embodiments 1-2 will not be described in detail in this embodiment. The difference thereof is that the structure of the separation and contact mechanism that realizes the contact and separation between the developing roller 901 and the photosensitive drum is different.

The process cartridge 900 includes a limiting portion arranged on a first casing 910*a*. The limiting portion is configured as a limiting protrusion 950*c* protruding in the first direction toward the direction away from a second end of the casing 910, and the limiting protrusion 950*c* is immovable relative to the first casing 910*a*. Specifically, the limiting protrusion 950*c* is arranged on a gear cover 959 of the first casing 910*a* and is integrally injection-molded with the gear cover 959 to reduce the number of molds and reduce the production cost. Correspondingly, the process cartridge 900 further includes a retaining portion arranged on a second casing 910*b*. The retaining portion is configured as a retaining protrusion 950 protruding in the first direction toward the direction close to the second end of the casing 910. The retaining protrusion 950 and the limiting protrusion 950*c* are opposite to each other, and in the first direction, the retaining protrusion 950 and the limiting protrusion 950*c* have an overlapping portion. In this way, the retaining protrusion 950 may cooperate with the limiting protrusion 950*c* to limit the relative position between the first casing 910*a* and the second casing 910*b*, so as to maintain the normal separation state between the developing roller 901 and the photosensitive drum. Specifically, the retaining protrusion 950 is provided on the first protective cover 911. Since the thickness of the first protective cover 911 is relatively thin, when the first protective cover 911 is subjected to a force from the first direction, it may undergo a certain degree of elastic deformation. Precisely because the first protective cover 911 may undergo elastic deformation under the force and the first casing 910*a* is located in the process cartridge 900, it is inevitable that there is a certain amount of movement in the first direction. Therefore, the retaining protrusion 950 may be provided as an immovable structure relative to the second casing 910*b*. When the first casing 910*a* moves relative to the second casing 910*b*, the limiting protrusion 950*c* may pass over the retaining protrusion 950 to realize the stable separation of the developing roller 901 and the photosensitive drum, and to avoid that the limiting protrusion 950*c* interferes with the retaining protrusion 950 during the movement of the first casing 910*a*. Therefore, the limiting protrusion 950*c* is preferably an arc-shaped protrusion or a protrusion with an inclined surface, and the retaining protrusion 950 is also preferably provided with a first inclined surface 950*a*1 and a second inclined surface 950*b*1 respectively arranged on both sides of the retaining protrusion 950. In this way, during the movement of the limiting protrusion 950*c*, the inclined surface arranged thereon or the inclined surface arranged on the retaining protrusion 950 can achieve the technical effect of guiding the movement of the limiting protrusion 950*c*, thereby preventing the limiting protrusion 950*c* from interfering with the movement and getting stuck. Further, since the limiting protrusion 950*c* and the retaining protrusion 950 require frequent friction during the contact and separation process of the drum and the roller, this puts higher requirements on the wear resistance of the two. However, since the first protective cover 911 has a lower requirement on wear resistance, the retaining protrusion 950 is configured to be detachably mounted in the mounting groove 911*a* of the first protective cover 911. The first protective cover 911 may be injection-molded using an ordinary ABS or HIPS material, while the retaining protrusion 950, which has a higher requirement on wear resistance, may be injection-molded using a POM material with better self-lubricating properties and greater wear resistance. That is, the two are made of different materials. In this way, there is no need to make both the first protective cover 911 and the retaining protrusion 950 using a POM material, which helps to reduce the production cost of the process cartridge 900. Preferably, the limiting protrusion 950*c* may also be injection- molded using a POM material.

Figure 26:
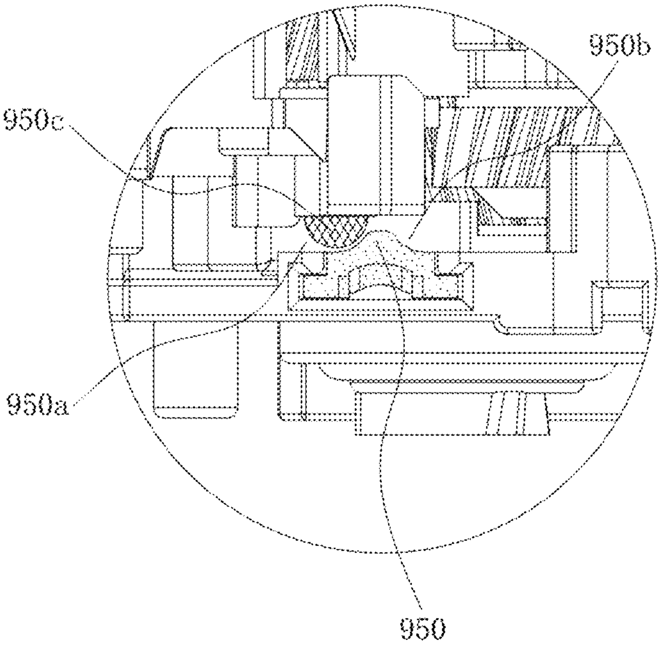
FIG. 26 is a schematic view of the positional relationship between the limiting protrusion and the retaining protrusion when a developing roller is in a developing position in Embodiment 3 of the present disclosure.
Figure 27:
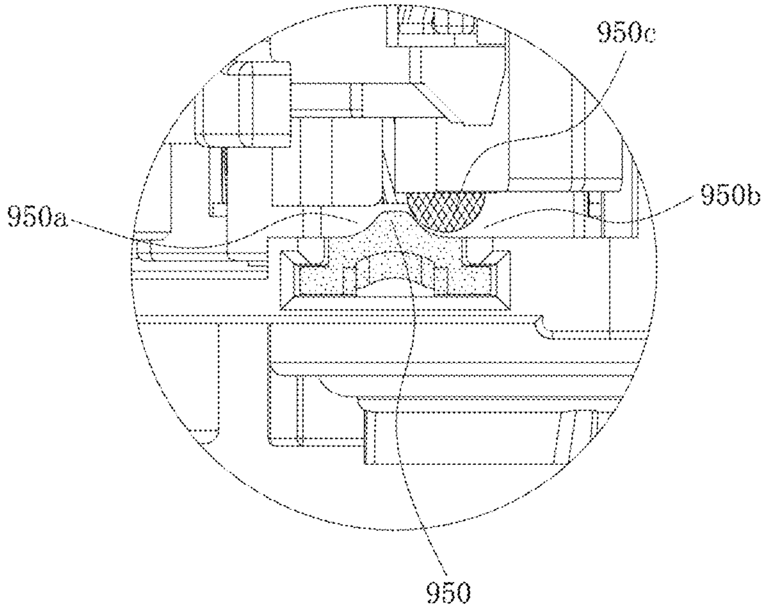
FIG. 27 is a schematic view of the positional relationship between the limiting protrusion and the retaining protrusion when the developing roller is in a separation position in Embodiment 3 of the present disclosure.
Figure 28:
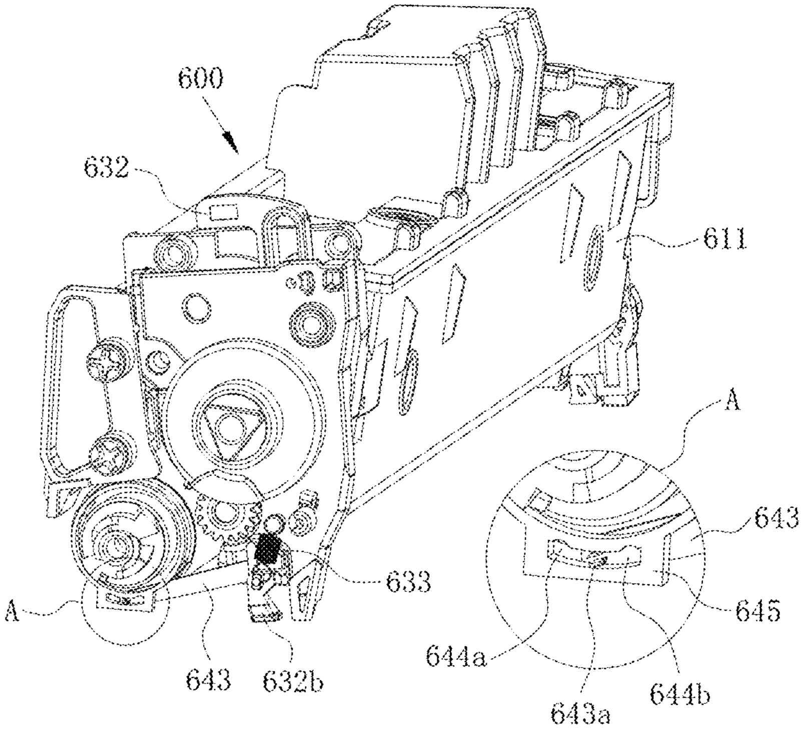
FIG. 28 is a schematic view of a process cartridge in Embodiment 4 of the present disclosure.
Figure 29:
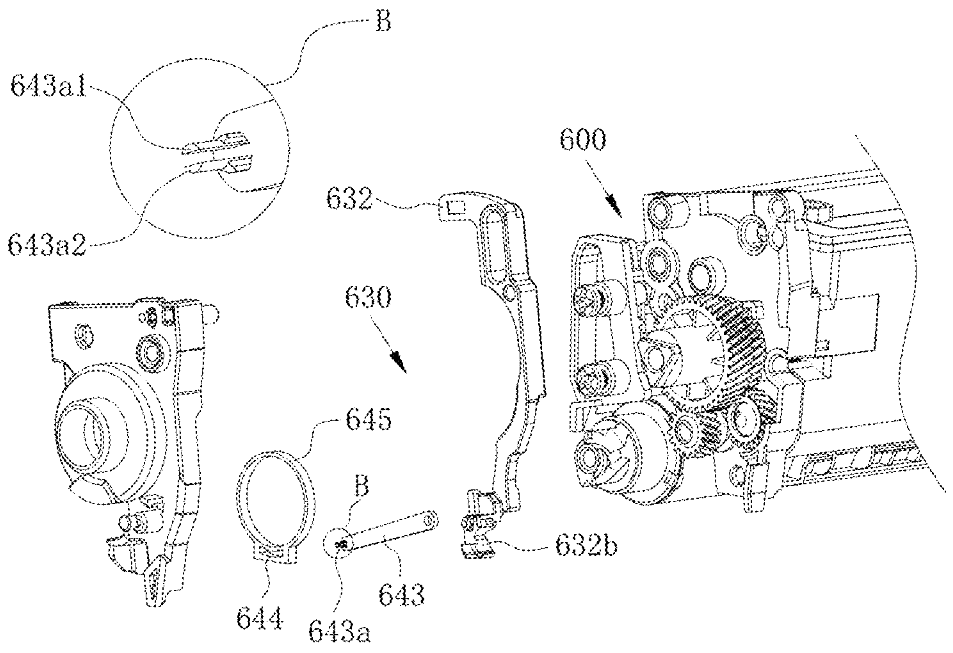
FIG. 29 is an exploded schematic view of a separation and contact mechanism in Embodiment 4 of the present disclosure.

Next, the contact and separation process of the developing roller 901 and the photosensitive drum will be described in detail with reference to FIGS. 26-27. When the process cartridge 900 does not need to execute a printing task, the developing roller 901 is in the separation position as shown in FIG. 26. At this time, the limiting protrusion 950*c* is located in a first accommodating space 950*a* on the first side of the retaining protrusion 950. When the process cartridge 900 needs to execute a printing task, the developing roller 901 needs to move from the separation position shown in FIG. 26 to the developing position shown in FIG. 27. Specifically, the separation control member 11 may push a second force receiving part 940*b*2 of the force receiving member 940, so that the limiting protrusion 950*c* provided on the first casing 910*a* can pass over the protruding end of the retaining protrusion 950 through the guidance of the first inclined surface 950*a*1. Finally, the limiting protrusion 950*c* leaves the first accommodating space 950*a* and moves to a second accommodating space 950*b* on the second side of the retaining protrusion 950. Subsequently, under the control of the image forming device, the pushing force applied to the second force receiving part 940*b*2 by the separation control member 11 is removed, and the first casing 910*a* is pushed by the elastic force of the spring so that the developing roller 901 maintains close contact with the photosensitive drum. In this way, the developing roller 901 can be stably located in the developing position. When the process cartridge 900 does not need to execute a printing task, the developing roller 901 needs to move from the developing position shown in FIG. 27 to the separation position shown in FIG. 26, and the separation control member 11 pushes the first force receiving part 940*b*1 of the force receiving member 940, so that the limiting protrusion 950*c* provided on the first casing 910*a* can pass over the protruding end of the retaining protrusion 950 through the guidance of the second inclined surface 950*b*1. Finally, the limiting protrusion 950*c* leaves the second accommodating space 950*b* and moves to the first accommodating space 950*a* on the first side of the retaining protrusion 950. Subsequently, under the control of the image forming device, the pushing force applied by the separation control member 11 to the first force receiving part 940*b*1 is removed, and the first casing 910*a* is pushed by the elastic force of the spring so that the limiting protrusion 950*c* maintains contact with the retaining protrusion 950. Since the two have a certain amount of interference in the first direction and there is no external force at this time, the limiting protrusion 950*c* will be unable to pass over the retaining protrusion 950. In this way, the position of the first casing 910*a* relative to the second casing 910*b* will be stably maintained, so that the developing roller 901 can be stably located in the separation position.

Embodiment 4

As shown in FIGS. 28-33, a process cartridge 600 of Embodiment 4 in the present disclosure is shown. The parts of the process cartridge 600 that are the same as those in the above-mentioned embodiments will not be described in detail here. The difference is that the structure of the separation and contact mechanism that forces the developing roller and the photosensitive drum to come into contact and separate is different.

The separation and contact mechanism 630 includes a force receiving member 632, a rod 643 and a restricting member 645. The structure and function of the force receiving member 632 are substantially the same as those of the force receiving member in the aforementioned embodiments, and will not be described in detail here. The rod 643 is movably connected between the force receiving member 632 and the restricting member 645. Specifically, one end of the rod 643 in the length direction is rotatably connected to the lower end of the force receiving member 632 through a hole-shaft clearance fit, and the restricted part 643*a* (substantially the same as the restricted part in Embodiment 2) at the other end of the rod 643 is connected to the restricting member 645. When the force receiving member 632 is pressed by the image forming device 1 and moves from top to bottom, the one end of the rod 643 connected to the force receiving member 632 may rotate relative to the force receiving member 632 while moving from top to bottom along with the force receiving member 632. The restricting member 645 is configured as an annular member, which is sleeved on the right end of the photosensitive drum. The lower end of the restricting member 645 is provided with a restricting portion 644 that is substantially the same as that in Embodiment 2. Therefore, the specific structure of the restricting portion 644 in this embodiment will not be described in detail. Next, the working process of the separation and contact mechanism 630 forcing the developing roller and the photosensitive drum to come into contact and separate will be described in detail.

Figure 30:
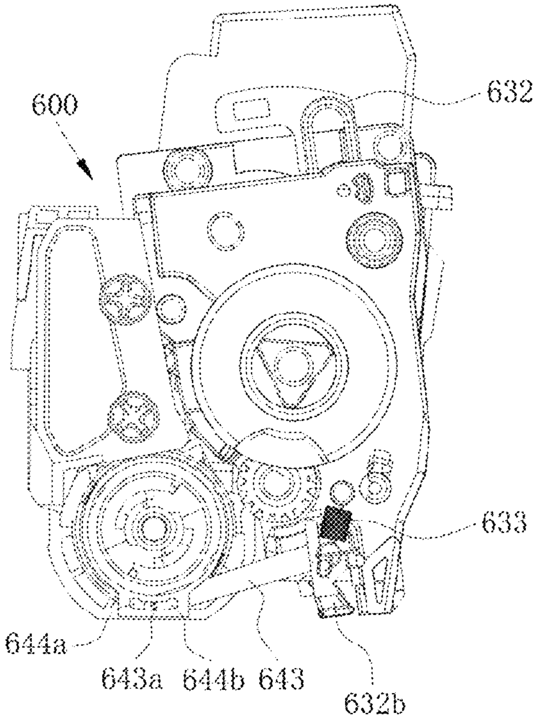
FIG. 30 is a schematic view of a force receiving member located in a first position in Embodiment 4 of the present disclosure.
Figure 31:
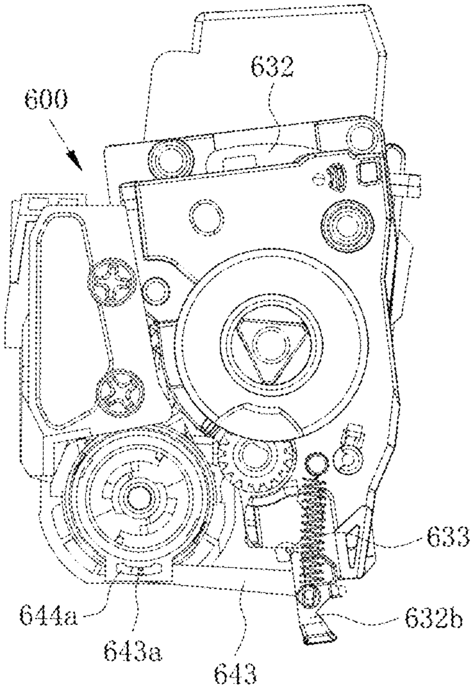
FIG. 31 is a schematic view of the force receiving member located in a second position and not urged by an external force in Embodiment 4 of the present disclosure.
Figure 32:
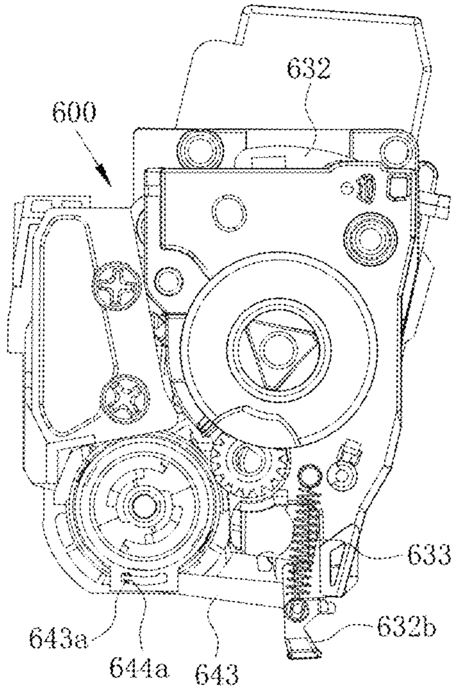
FIG. 32 is a schematic view of the separation and contact mechanism when a developing roller comes into contact with a photosensitive drum in Embodiment 4 of the present disclosure.
Figure 33:
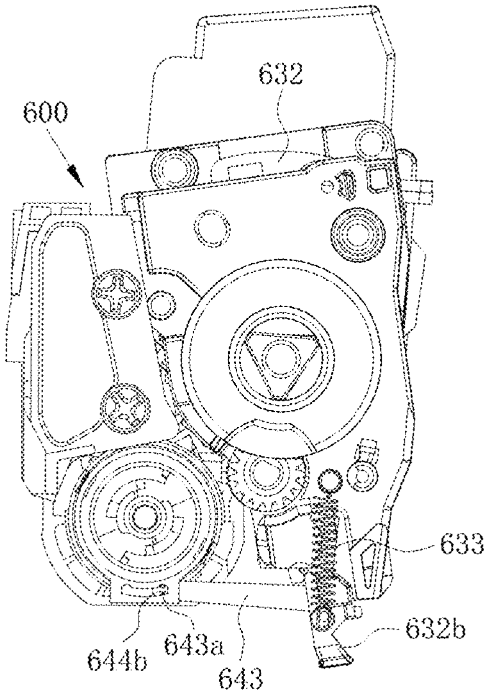
FIG. 33 is a schematic view of the separation and contact mechanism when the developing roller is separated from the photosensitive drum in Embodiment 4 of the present disclosure.
Figure 34:
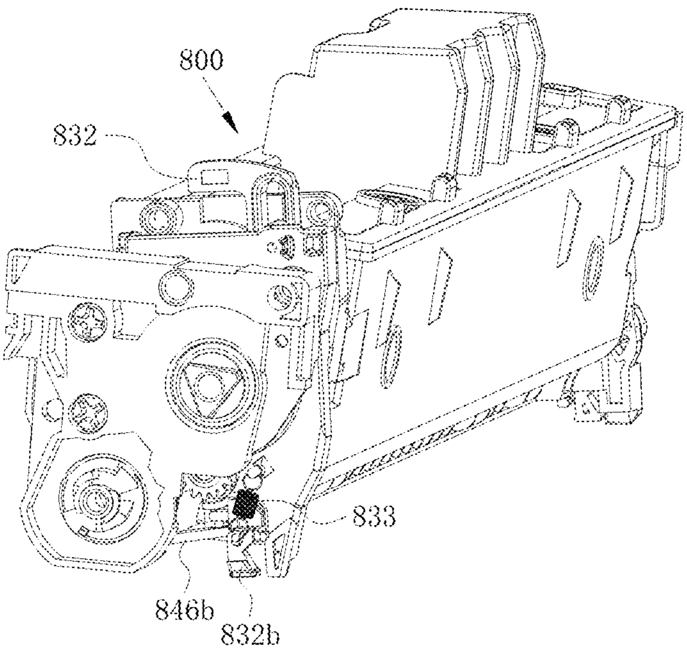
FIG. 34 is a schematic view of a process cartridge when a force receiving member is located in a first position in Embodiment 5 of the present disclosure when viewed from an angle.
Figure 35:
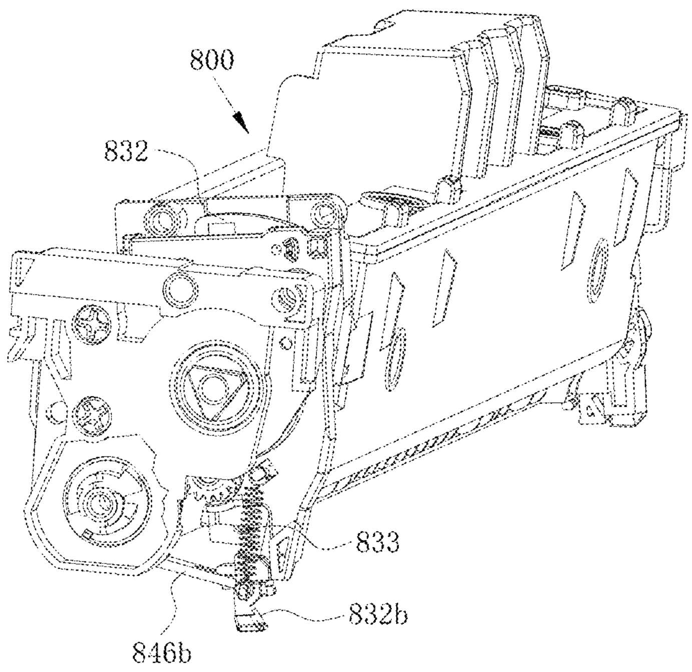
FIG. 35 is a schematic view of the process cartridge when the force receiving member is located in a second position in Embodiment 5 of the present disclosure when viewed from the angle.
Figure 36:
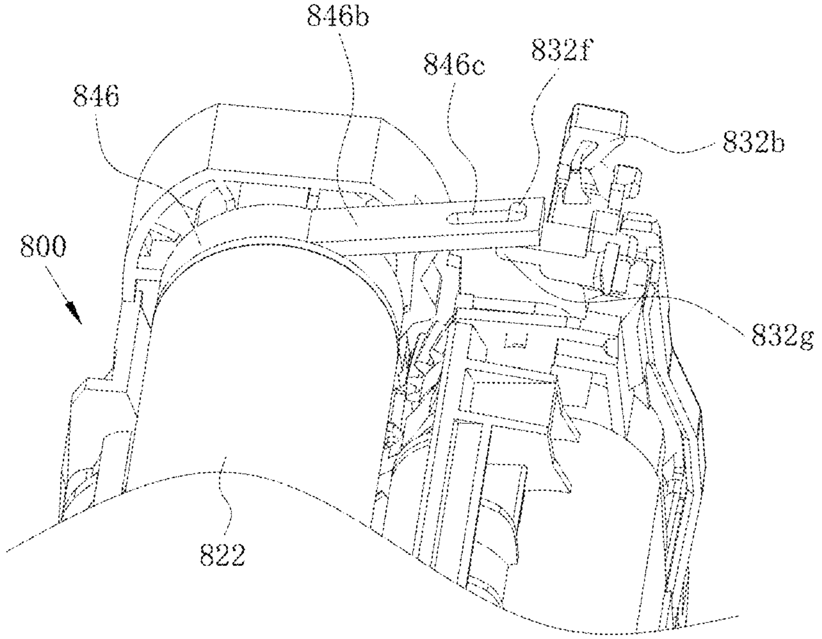
FIG. 36 is a schematic view of the process cartridge in Embodiment 5 of the present disclosure when viewed from another angle.
Figure 37:
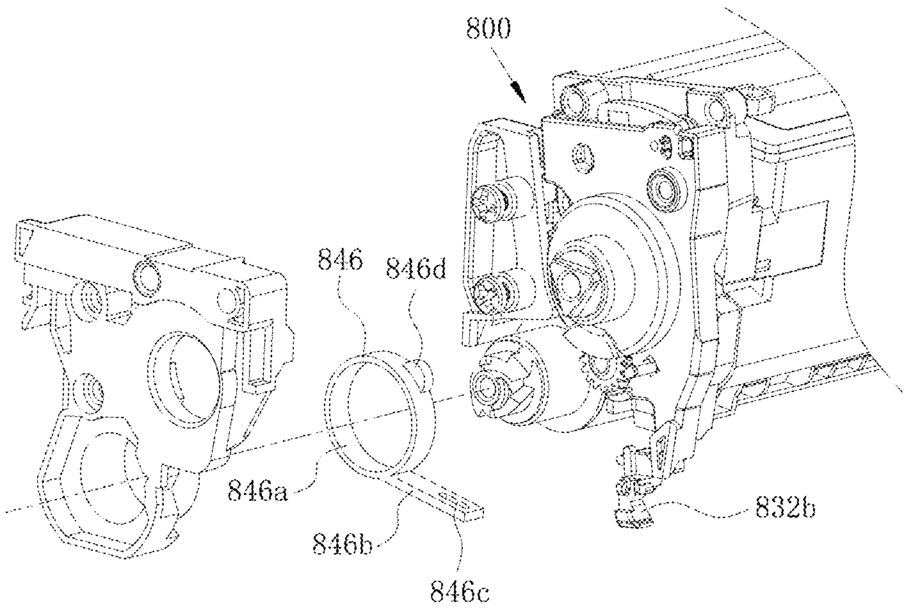
FIG. 37 is an exploded schematic view of a separation and contact mechanism of the process cartridge in Embodiment 5 of the present disclosure.
Figure 38:
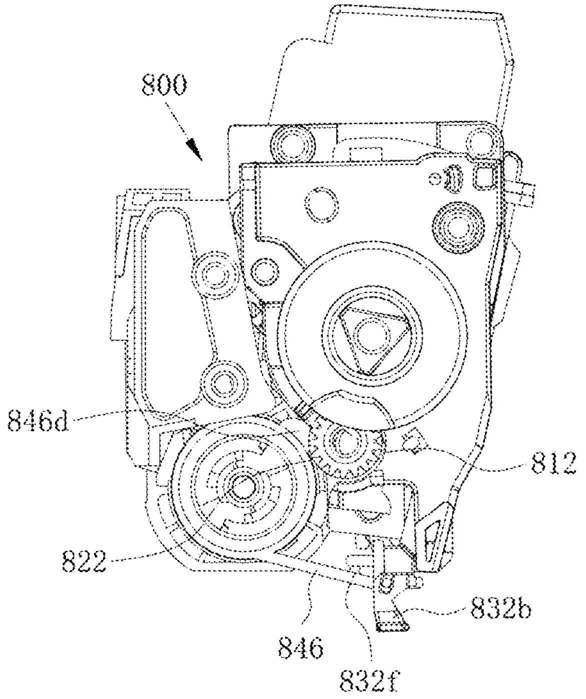
FIG. 38 is a schematic view of the separation and contact mechanism when a developing roller comes into contact with a photosensitive drum in Embodiment 5 of the present disclosure.
Figure 39:
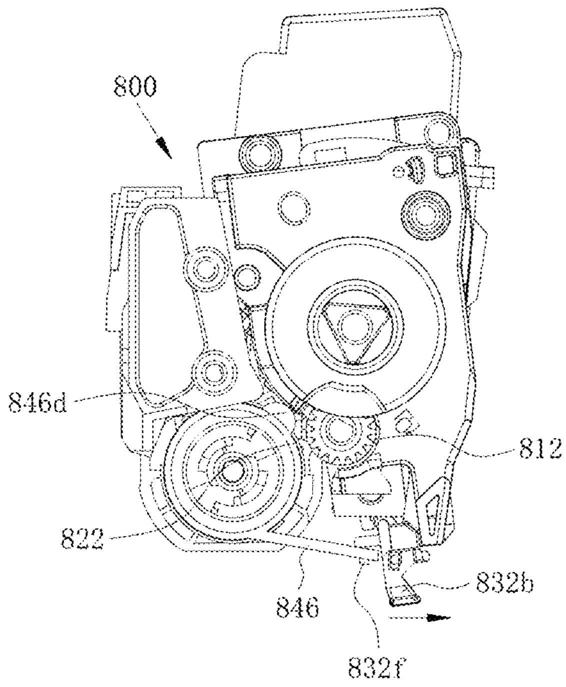
FIG. 39 is a schematic view of the separation and contact mechanism when the developing roller is separated from the photosensitive drum in Embodiment 5 of the present disclosure.

In addition, as shown in FIG. 30, when the force receiving member 632 is in the first position, the restricted part 643*a* of the rod 643 is engaged in the groove between the second restricting portion 644*a* and the first restricting portion 644*b*. At this time, the first protrusion 643*a*1 and the second protrusion 643*a*2 of the restricted portion 643*a* are deformed and are in a closed state close to each other, and the state in which the developing roller and the photosensitive drum is kept separated is maintained. When the force receiving member 632 overcomes the elastic force of the first elastic member 633 to move from the first position to the second position, and the urged surface 632*b* of the force receiving member 632 in the second position is subjected to a backward urging force from the image forming device 1, the rod 643 may be pushed by the force receiving member 632 to move backward. During the backward movement of the rod 643, the restricted part 643*a* of the rod 643 may slide in the restricting portion 644 until the restricted part 643*a* is engaged in the second restricting portion 644*a*, and the restricted part 643*a* is no longer deformed and is in an expanded state away from each other. At this time, the urging force applied to the force receiving member 632 is removed, and the restricted part 643*a* in the expanded state is blocked by a groove, which is adjacent to the second restricting portion 644*a* and located between the second restricting portion 644*a* and the first restricting portion 644*b*, so that the position where the restricted portion 643*a* is engaged on the second restricting portion 644*a* is maintained. Finally, the state in which the developing roller is kept in contact with the photosensitive drum is maintained. When the developing roller and the photosensitive drum need to move from the contact state to the separation state, the urged surface 632*b* of the force receiving member 632 may be urged forward by the image forming device 1. At this time, the force receiving member 632 drives the rod 643 to move forward together. During the forward movement of the rod 643, the restricted part 643*a* of the rod 643 may slide in the groove between the second restricting portion 644*a* and the first restricting portion 644*b*, and the second restricting portion 644*a* and the first restricting portion 644*b* are squeezed and deformed by the inner wall of the groove and are in a closed state close to each other, so as to prevent the interference between the restricted part 643*a* and the restricting portion 644. As the rod 643 moves further forward, the restricted part 643*a* is finally engaged in the first restricting portion 644*b*, and the restricted part 643*a* is no longer deformed and is in an expanded state away from each other. At this time, the urging force applied to the force receiving member 632 is removed, the restricted part 643*a* in the expanded state is maintained in a position engaged with the first restricting portion 644*b*, and the state in which the developing roller is kept separated from the photosensitive drum is maintained.

Embodiment 5

Next, Embodiment 5 of the present disclosure will be introduced. As shown in FIGS. 34-39, a process cartridge is shown in Embodiment 5. The parts of the process cartridge that are the same as those the process cartridges in Embodiments 1-4 described above will not be described in detail here. The difference is that the structure of the separation and contact mechanism of the process cartridge in this embodiment is different.

Specifically, the separation and contact mechanism in this embodiment includes a force receiving member 832 that may receive the pressing force of the image forming device 1 and move in the up-down direction. The separation and contact mechanism further includes a separation holding member 846 connected to the lower end of the force receiving member 832 and may move in response to the movement of the force receiving member 832. The separation holding member 846 is rotatably sleeved on the coupling member, coupling member configured to transmit a driving force to the photosensitive drum, and the separation holding member 846 includes a main body part 846*a* configured as an annular shape, and a force bearing arm 846*b* and a separation holding portion 846*d* (i.e., the restricted part described above) protruding radially outward from the main body part 846*a*. The force bearing arm 846*b* and the separation holding portion 846*d* are both configured as protrusions and are arranged at intervals in the circumferential direction of the main body part 846*a*. Preferably, the separation holding portion 846*d* (restricted part) is arranged on the separation holding member 846 and is configured as a cam, wherein a groove 846*c* is formed on the force bearing arm 846*b*, and a connecting protrusion 832*f* provided on the lower end of the force receiving member 832 may be inserted into the groove 846*c*. When the force receiving member 832 is in the first position, the separation holding member 846 is in the second position, and it stably abuts the pressure receiving surface of the developing unit, so that the developing roller 812 is kept separated from the photosensitive drum 822. When the force receiving member 832 moves from the first position to the second position, the force receiving member 832 may push the force-bearing arm 846*b* of the separation holding member 846 to force the separation holding member 846 to rotate by a certain angle. At this time, the separation holding portion 846*d* of the separation holding member 846 still stably abuts the pressure bearing surface of the developing unit, and the developing roller 812 is still kept separated from the photosensitive drum 822. When the urged surface 832*b* of the force receiving member 832 is subjected to a backward urging force, the force receiving member 832 may urge the force bearing arm 846*b* to force the separation holding member 846 to rotate by a certain angle again and rotate from the second position to the first position, and the separation holding portion 846*d* is disengaged from contact with the pressure bearing surface of the developing unit. Under the elastic force of the first elastic member 833, the developing roller 812 moves from the separation position in which it is separated from the photosensitive drum 822 to the developing position in which they come into contact. When the developing roller 812 and the photosensitive drum 822 need to be separated, the urged surface 832*b* of the force receiving member 832 is subjected to a forward urging force of the image forming device, and the separation holding member 846 is pushed by the force receiving member 832 and rotates from the first position to the second position. At this time, the separation holding portion 846*d* abuts the pressure bearing surface of the developing unit, and the developing roller 812 is kept separated from the photosensitive drum 822. Even if the urging force on the image forming device is subsequently removed from the force receiving member 832, the developing roller 812 and the photosensitive drum 822 will continue to remain separated by virtue of the separation holding portion 846*d* abutting the pressure bearing surface of the developing unit.

Embodiment 6

Figure 40:
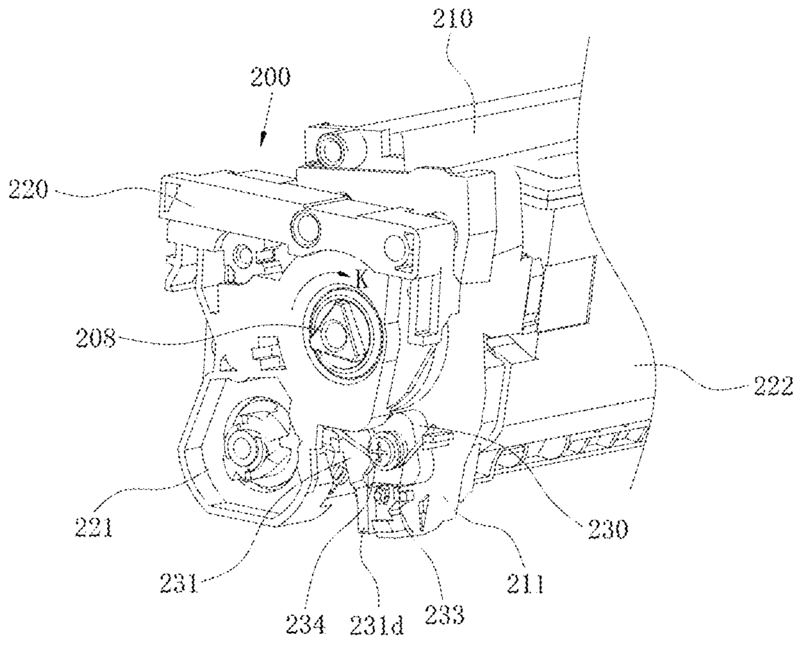
FIG. 40 is a schematic view of a process cartridge in Embodiment 6 of the present disclosure.
Figure 41:
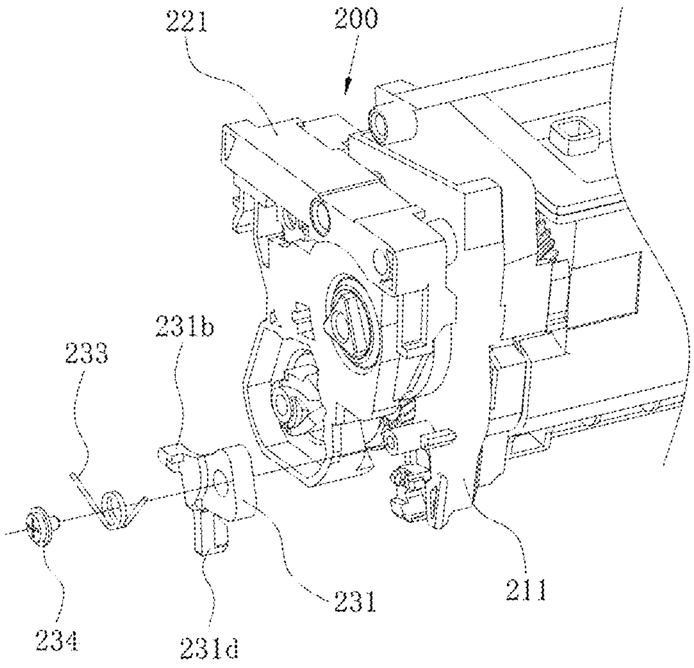
FIG. 41 is an exploded schematic view of a separation and contact mechanism of the process cartridge in Embodiment 6 of the present disclosure.
Figure 42:
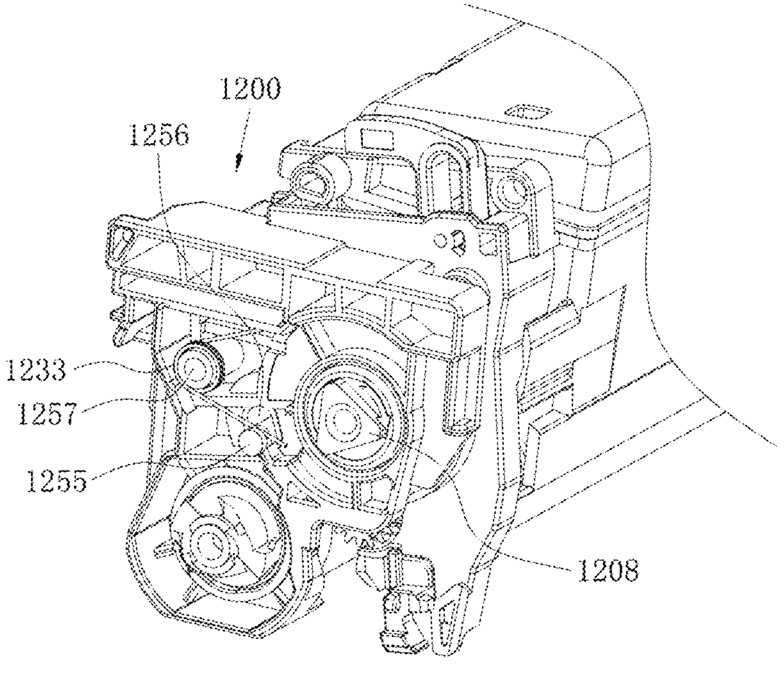
FIG. 42 is a schematic view of a process cartridge when a developing roller is separated from a photosensitive drum in Embodiment 7 of the present disclosure when viewed from an angle.
Figure 43:
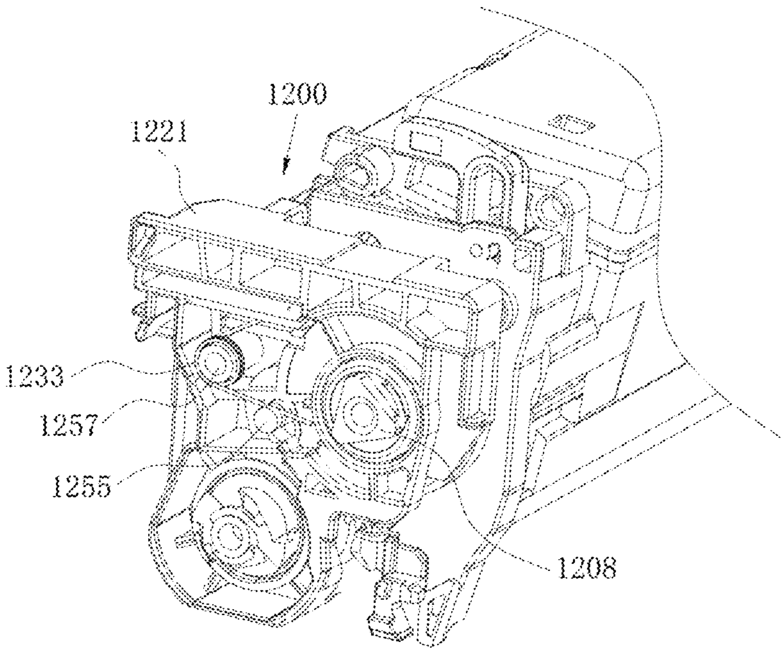
FIG. 43 is a schematic view of the process cartridge when the developing roller comes into contact the photosensitive drum in Embodiment 7 of the present disclosure when viewed from the angle.
Figure 44:
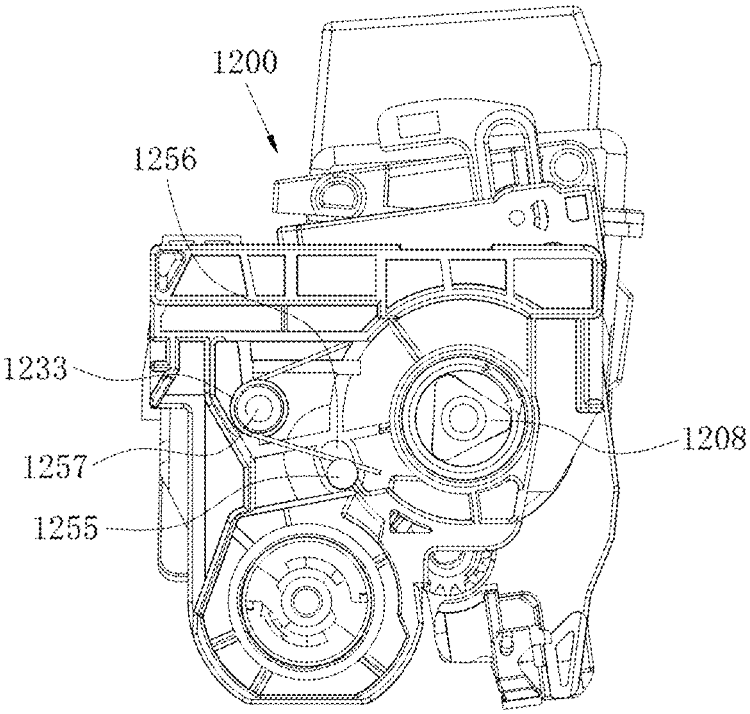
FIG. 44 is a schematic view of the process cartridge in Embodiment 7 of the present disclosure when viewed from an angle.
Figure 45:
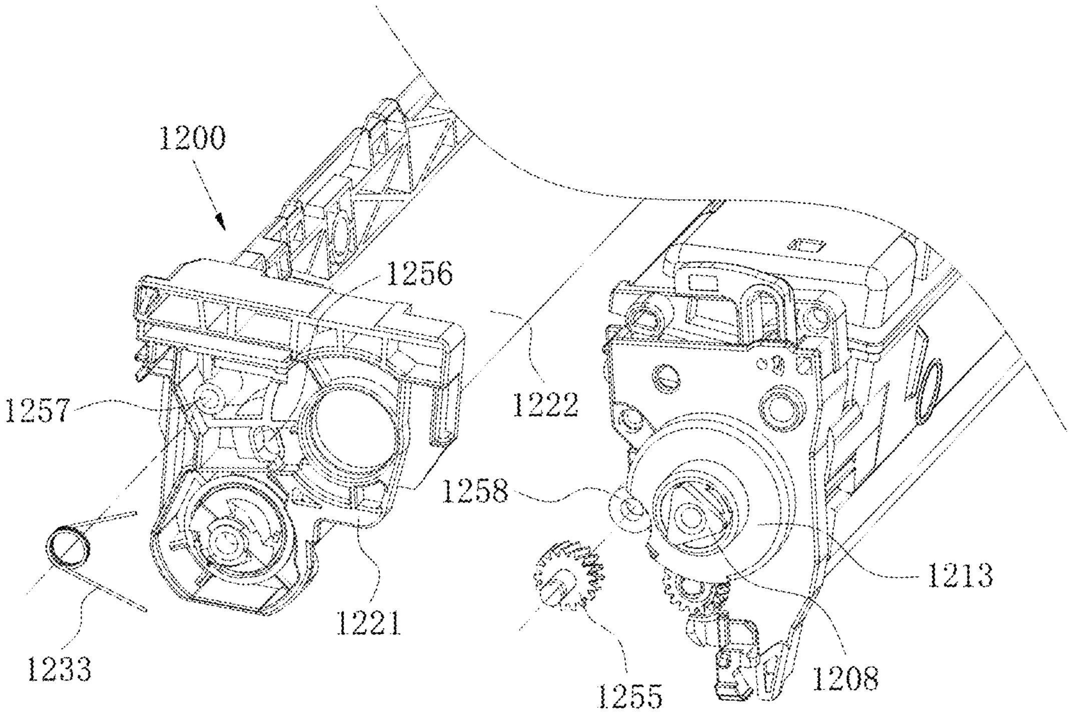
FIG. 45 is an exploded schematic view of the process cartridge in Embodiment 7 of the present disclosure.

Next, Embodiment 6 of the present disclosure will be introduced with reference to FIGS. 40-41. A process cartridge 200 is shown in Embodiment 6. The parts of the process cartridge that are the same as those of the process cartridges in Embodiments 1-5 described above will not be described in detail here. The difference is that the structure of the separation and contact mechanism 230 of the process cartridge 200 in this embodiment is different.

The process cartridge 200 includes a separation holding member 231 and a first elastic member 233 which are swingably arranged on the developing unit 210, and a positioning member 234 for positioning the separation holding member 231 and the first elastic member 233 on the developing frame 211. Preferably, the positioning member is preferably a screw. Optionally, it may also be an elastic buckle structure, which is not a limitation. In this embodiment, the separation holding member 231 also has a separation holding portion 231*b*, the separation holding portion 231*b* is configured to a protrusion), the drum frame 221 has an abutment part, the separation holding portion 231*b* may abut the abutment part of the drum frame 221, and will not be described in detail here. One end of the first elastic member 233 abuts the developing frame 211, and the other end abuts the separation holding member 231. The first elastic member 233 is configured so that when the process cartridge 200 is not subjected to an external force, the elastic force generated by the first elastic member 233 may force the separation holding member 231 to remain in the first position, that is, the developing unit 210 is in the separation position where the developing roller and the photosensitive drum 222 are separated from each other. In other words, the elastic force generated by the first elastic member 233 is sufficient to overcome, for example, the elastic force of a spring (not shown in this embodiment) to cause the developing roller and the photosensitive drum 222 to separate from each other. Preferably, the first elastic member 233 is a torsion spring, which has a simple structure and a low use cost.

Further, when the process cartridge 200 needs to switch from a state where no printing tasks need to be executed to a state where a printing task needs to be executed, the coupling member 208 of the developing unit 210 receives the rotational driving force of the image forming device 1, so that the developing unit 210 receives a rotational torque. When viewed from right to left, the direction of the rotational torque is clockwise (i.e., the K direction in the figures). The rotational torque acts on the developing unit 210, so that the developing roller of the developing unit 210 has a tendency to move toward the photosensitive drum 222 close to the drum unit 220. At this time, in order to ensure that the developing unit 210 may move from the separation position where the developing roller and the photosensitive drum 222 are separated from each other to the developing position where the developing roller and the photosensitive drum 222 are in contact with each other, the first elastic member 233 is configured so that the elastic force generated thereby is smaller than the sum of the elastic force of the spring and the force of the rotational torque. That is, when the process cartridge 200 executes a printing task, the elastic force generated by the first elastic member 233 is insufficient to resist the sum of the elastic force of the spring and the force of the rotational torque, which will cause the separation holding member 231 to disengage from the contact with the abutment part of the drum frame 221 and swing from the first position to the second position. Therefore, under the combined action of the elastic force of the spring and the force of the rotational torque, the separation holding member 231 is stably maintained in the second position, the developing roller and the photosensitive drum 222 will come into contact each other again, and the posture of the developing unit 210 is maintained in the developing position.

Further, the separation holding member 231 is still provided with a constraining portion 231*d*. The constraining portion 231*d* may abut the developing frame 211 or the drum frame 221 or other components different from the separation holding member 231, so that the separation holding member 231 is blocked during the swinging process to limit the separation holding member 231 within its allowed swinging range, thereby preventing the separation holding member 231 from deviating from a correct swinging position.

The separation and contact mechanism 230 of the process cartridge 200 in this embodiment has been further simplified in structure. It can achieve the contact or separation of the developing roller and the photosensitive drum 222 without the help of any urging force outside the process cartridge 200. While the structure of the process cartridge is simplified, the structure of the image forming device is also simplified accordingly.

Embodiment 7

Next, the process cartridge 1200 in Embodiment 7 of the present disclosure will be introduced in detail with reference to FIGS. 42-45. The parts of the process cartridge 1200 that are the same as those in the process cartridge in Embodiment 6 described above will not be described in detail here. The difference is that the separation and contact mechanism on the process cartridge 1200 is different.

The separation and contact mechanism of the process cartridge 1200 includes a first elastic member 1233 and a separation holding member 1255. The first elastic member 1233 is mounted on a mounting column 1233 at one end of the drum frame 1221 in the left-right direction. The separation holding member 1255 is rotatably mounted on a mounting hole 1258 on the bearing cover 1213 of the developing unit. One end of the first elastic member 1233 abuts the drum frame 1221, and the other end abuts the separation holding member 1255 and may apply an elastic pushing force to the separation holding member 1255. Preferably, the first elastic member 1233 is a torsion spring and is configured to be capable of pushing the separation holding member 1255 to keep it in the first position when the process cartridge 1200 does not receive an external force. At this time, the developing roller is separated from the photosensitive drum 1222, that is, the pushing force applied by the first elastic member 1233 to the separation holding member 1255 (that is, the pushing force applied to the developing unit) at this time is greater than the force applied by the spring to the developing unit, so as to force the developing unit to remain in the position where the developing roller is separated from the photosensitive drum 1222. Further, the separation holding member 1255 is configured as a gear and is arranged to maintain meshing with the gear portion (not shown) of the coupling member 1208. When the coupling member 1208 receives the driving force from the image forming device 1 and rotates, the rotational torque generated by the coupling member 1208 may overcome the elastic pushing force of the first elastic member 1233 and drive the developing unit to rotate, forcing the developing roller to move from the separation position where it is separated from the photosensitive drum 1222 to the developing position where it is in contact with the photosensitive drum 1222. During this period, the coupling member 1208 may drive the separation holding member 1255 to rotate, and the separation holding member 1255 may rotate along an avoidance groove 1256 formed on a driving side protective cover together with the developing unit, and finally remain in the second position. Preferably, the avoidance groove 1256 is an arc groove.

In general, the process cartridge 1200 in this embodiment is provided with the first elastic member 1233 and a separation holding member 1255. When the coupling member 1208 does not receive an external force, the elastic force generated by the first elastic member 1233 may be applied to the separation holding member 1255 and may push the separation holding member 1255 to be held in the first position with the developing unit, thereby separating the developing roller from the photosensitive drum 1222. When the coupling member 1208 is driven to rotate, the coupling member 1208 is meshed with the separation holding member 1255 and the rotational torque generated by the coupling member 1208 may force the developing unit to rotate, thereby causing the separation holding member 1255 to move from the first position to the second position, and allowing the developing roller to come into contact with the photosensitive drum 1222.

Embodiment 8

Next, Embodiment 8 of the present disclosure will be introduced. Embodiment 8 shows a process cartridge. The parts of the process cartridge that are the same as those of the process cartridges in Embodiments 1-7 described above will not be described in detail here. The difference is that the separation and contact mechanism of the process cartridge in this embodiment is only arranged on either side of the left and right sides of the process cartridge to avoid the following problem: in the process of the separation and contact mechanism receiving a separation force that causes the developing roller and the photosensitive drum to move from the developing position to the separation position, the left and right sides of the process cartridge are separated asynchronously. Once the problem of asynchronous separation of the two sides occurs, the process cartridge is prone to printing quality problems when executing printing tasks. Therefore, the separation and contact mechanism of the process cartridge in this embodiment is only arranged on either of the left and right sides of the process cartridge, that is, the limited part is only provided on one side. Further, because the storage unit frame on the left side of the process cartridge may be pressed by the pressing member, the left side of the process cartridge may be stably positioned. When the separation and contact mechanism is still arranged on the left side of the process cartridge and not on the right side, the right side of the process cartridge will lose the pressing force, resulting in unbalanced force on the left and right sides of the process cartridge. At this time, the positioning of the right side of the process cartridge will become unstable. During the operation of the process cartridge, the rotational torque generated by the rotation of rotating members such as the coupling member will cause the shaking of the process cartridge to increase, which will affect the printing quality of the process cartridge. At this time, it is preferable that the separation and contact mechanism is arranged on the right side of the process cartridge, that is, the limited part is arranged on the right side of the process cartridge, so that the pressing member in the image forming device may press the right side of the process cartridge. As a result, both the left and right sides of the process cartridge may receive the pressing force, thereby improving the positioning stability of the left and right sides of the process cartridge. It is worth mentioning that in this embodiment, the separation and contact mechanism is only provided on one side of the process cartridge, which is applicable to any one of the process cartridges of Embodiments 1-7 described above.

What is claimed is:

1. A process cartridge, comprising:

a photosensitive drum configured to rotate about a photosensitive drum rotation axis extending in a first direction;

a drum unit comprising the photosensitive drum;

a developing roller configured to deposit toner on the photosensitive drum, the developing roller being rotatable about a developing roller rotation axis extending in the first direction;

a developing unit comprising the developing roller and being movable relative to the drum unit between a developing position in which the toner is capable of being deposited onto the photosensitive member from the developing roller, and a separation position where at least a part of the developing roller is separated from the photosensitive drum;

a chip having an electrical contact surface;

an elastic component; and a retaining component;

wherein the elastic component is configured to bias the developing unit, from the developing position to the separation position;

wherein the retaining component has a protrusion movable relative to the developing unit;

wherein the developing unit or the drum unit has an abutment part, and the protrusion is configured to engage the abutment part, and to maintain the developing unit in the separation position;

wherein the developing unit further comprises a first coupling member configured to drive the developing roller to rotate; and wherein when the developing unit is in the separation position and the first coupling member rotates, the retaining component is configured to move in response to rotation of the first coupling member, thereby causing the protrusion to disengage from the abutment part to allow the developing unit to move from the separation position to the developing position.

2. The process cartridge according to claim 1, wherein the developing unit is configured to move from the separation position to the developing position by receiving a torque generated by the rotation of the first coupling member.

3. The process cartridge according to claim 1, wherein the retaining component is a gear.

4. The process cartridge according to claim 1, wherein the retaining component comprises a restricting part, and the restricting part is configured to abut at least one component in the process cartridge, thereby restricting a movement range of the retaining component.

5. The process cartridge according to claim 1, wherein the process cartridge has a first end and a second end separated from each other in the first direction; wherein the first coupling member and the retaining component are located at the first end of the process cartridge, and the electrical contact surface is located at the second end of the process cartridge.

6. The process cartridge according to claim 1, wherein when the process cartridge is oriented such that the photosensitive drum and the developing roller are located at a lower end of the process cartridge and the photosensitive drum rotation axis is below the developing roller rotation axis, the electrical contact surface is located on the drum unit and is above the retaining component.

7. The process cartridge according to claim 1, wherein the process cartridge has a first end and a second end separated from each other in the first direction, and wherein the retaining component is only at the first end or the second end.

8. The process cartridge according to claim 1, further comprising:

a protective cover at one end of the process cartridge in the first direction, the protective cover having a hole and a recess;

a second coupling member configured to receive an external force and to transmit a driving force to the photosensitive drum;

wherein a part of the second coupling member extends through the hole and is exposed to an outside of the process cartridge, and a part of the first coupling member extends through the recess and is exposed to the outside of the process cartridge; and wherein the recess is not closed in a direction perpendicular to the first direction.

9. The process cartridge according to claim 8, wherein when the process cartridge is oriented such that the photosensitive drum and the developing roller are located at a lower end of the process cartridge and the photosensitive drum rotation axis is below the developing roller rotation axis, the recess extends upward to an upper end of the protective cover.

10. The process cartridge according to claim 8, wherein the process cartridge is configured to detachably mount along a mounting direction into an image forming device having a cartridge frame, to be supported in the cartridge frame, and a side of the recess facing the mounting direction is not closed.

11. The process cartridge according to claim 1, wherein the process cartridge further comprises a protective cover located at one end of the process cartridge in the first direction;

wherein the protective cover has a hole, and a cutout is provided at a position adjacent to the protective cover;

wherein the electrical contact surface and the photosensitive drum are arranged in an up-down direction intersecting the first direction;

wherein the cutout extends from an upper end of the protective cover to a lower end of the protective cover in the up-down direction;

wherein the process cartridge further comprises a second coupling member configured to receive an external force and to transmit a driving force to the photosensitive drum; and wherein a part of the second coupling member extends through the hole and is exposed to an outside of the process cartridge, and a part of the first coupling member extends through the cutout and is exposed to the outside of the process cartridge.

12. A process cartridge, comprising:

a photosensitive drum rotatable about a photosensitive drum rotation axis extending in a first direction;

a drum unit comprising the photosensitive drum;

a developing roller configured to deposit toner on the photosensitive drum, the developing roller being rotatable about a developing roller rotation axis extending in the first direction;

a developing unit comprising the developing roller and being movable relative to the drum unit between a developing position in which the toner is capable of being deposited onto the photosensitive member from the developing roller, and a separation position where at least a part of the developing roller is separated from the photosensitive drum;

a first coupling member configured to rotate, and being provided at a first end of the process cartridge in the first direction;

a chip having an electrical contact surface; and a retaining component having a protrusion;

wherein in the first direction, the protrusion is located at the first end of the process cartridge, and the electrical contact surface is at a second end of the process cartridge separate from the first end in the first direction;

wherein the retaining component is configured to move relative to the photosensitive drum by receiving a driving force from the developing unit;

wherein the retaining component is rotatably provided at one end of the photosensitive drum and arranged coaxially with the photosensitive drum; and wherein the protrusion abuts the developing unit, thereby maintaining the developing unit in the separation position.

13. The process cartridge according to claim 12, wherein when the process cartridge is oriented such that the photosensitive drum and the developing roller are located at a lower end of the process cartridge and the photosensitive drum rotation axis is below the developing roller rotation axis, the electrical contact surface is located on the drum unit and is above the retaining component.

14. The process cartridge according to claim 12, further comprising a second coupling member provided at one end of the photosensitive drum, the second coupling member configured to cause the photosensitive drum to rotate by receiving a driving force from an image forming device; wherein the retaining component is rotatably mounted on the second coupling member.

15. The process cartridge according to claim 12, further comprising a second coupling member provided at one end of the photosensitive drum, the second coupling member configured to cause the photosensitive drum to rotate by receiving a driving force from an image forming device; wherein the electrical contact surface is farther away from an extended end of the second coupling member than the retaining component in the first direction.

16. The process cartridge according to claim 12, further comprising a protective cover located at one end of the process cartridge in the first direction, the protective cover having a hole and a recess;

wherein the process cartridge further comprises a second coupling member configured to receive an external force and to transmit a driving force to the photosensitive drum;

wherein a part of the second coupling member extends through the hole and is exposed to an outside of the process cartridge;

wherein the first coupling member is configured to cause the developing roller to rotate;

wherein a part of the first coupling member extends through the recess and is exposed to the outside of the process cartridge; and wherein the recess is not closed in a direction perpendicular to the first direction.

17. The process cartridge according to claim 16, wherein when the process cartridge is oriented such that the photosensitive drum and the developing roller are located at a lower end of the process cartridge and the photosensitive drum rotation axis is below the developing roller rotation axis, the recess extends upward to an upper end of the protective cover.

18. The process cartridge according to claim 16, wherein the process cartridge is configured to detachably mount along a mounting direction into an image forming device having a cartridge frame, to be supported in the cartridge frame, and a side of the recess facing the mounting direction is not closed.

19. The process cartridge according to claim 12, further comprising a protective cover located at one end of the process cartridge in the first direction;

wherein the protective cover has a hole, and a cutout is provided at a position adjacent to the protective cover;

wherein the electrical contact surface and the photosensitive drum are arranged in an up-down direction intersecting the first direction;

wherein the cutout extends from an upper end of the protective cover to a lower end of the protective cover in the up-down direction;

wherein the process cartridge further comprises a second coupling member configured to receive an external force and to transmit a driving force to the photosensitive drum;

wherein a part of the second coupling member extends through the hole and is exposed to an outside of the process cartridge; and wherein the first coupling member is configured to cause the developing roller to rotate, and a part of the first coupling member extends through the cutout and is exposed to the outside of the process cartridge.

* * * * *